US012699219B2

(12) United States Patent
Kuo

(10) Patent No.: US 12,699,219 B2
(45) Date of Patent: Aug. 4, 2026

(54) OPTICAL LENS AND DISPLAY DEVICE

(71) Applicant: Coretronic Corporation, Hsin-Chu (TW)

(72) Inventor: Tao-Hung Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 476 days.

(21) Appl. No.: 18/181,551

(22) Filed: Mar. 10, 2023

(65) Prior Publication Data

US 2023/0288626 A1     Sep. 14, 2023

Related U.S. Application Data

(60) Provisional application No. 63/318,782, filed on Mar. 11, 2022.

(30) Foreign Application Priority Data

May 27, 2022     (CN) ......................... 202210591776.X

(51) Int. Cl.
*G02B 6/00* (2006.01)
*F21V 8/00* (2006.01)
(Continued)

(52) U.S. Cl.
CPC .............. *G02B 6/003* (2013.01); *G02B 9/34* (2013.01); *G02B 27/0101* (2013.01); *G02B 27/0172* (2013.01); *G03B 13/06* (2013.01)

(58) Field of Classification Search
CPC ...... G02B 6/003; G02B 9/34; G02B 27/0101; G02B 27/0172; G03B 13/06
See application file for complete search history.

(56) References Cited

U.S. PATENT DOCUMENTS 8,587,869 B2    11/2013   Totani et al.
2010/0259632 A1    10/2010   Matsusaka et al.
(Continued)

FOREIGN PATENT DOCUMENTS

CN        109932820        6/2019
EP        3757658        12/2020
(Continued)

OTHER PUBLICATIONS

"Office Action of China Counterpart Application", issued on Mar. 18, 2026, p. 1-p. 7.

*Primary Examiner* — Wen Huang
(74) *Attorney, Agent, or Firm* — JCIPRNET

(57) ABSTRACT

An optical lens adapted to receive an image beam from an imaging element is provided. The optical lens sequentially includes a first lens, a second lens, a third lens, and a fourth lens with refracting power along an optical axis from a light incidence side to a light exit side, and the first lens to the fourth lens each include a light incidence surface facing the light incidence side and a light exit surface facing the light exit side. The first lens has positive refracting power. The second lens has negative refracting power. The third lens has positive refracting power. The first lens or the third lens is made of glass. The optical lens receives the image beam from the light incidence side. The image beam forms a stop on the light exit side, and the image beam forms the minimum beam cross-section at a location of the stop.

19 Claims, 32 Drawing Sheets

(51) Int. Cl.
    *G02B 9/34*          (2006.01)
    *G02B 27/01*       (2006.01)
    *G03B 13/06*       (2021.01)

(56)             References Cited

U.S. PATENT DOCUMENTS

| 2012/0224271 | A1* | 9/2012 | Matsuo | G02B 13/22 |
| | | | | 359/716 |
| 2019/0187353 | A1* | 6/2019 | Kuo | G02B 3/04 |
| 2020/0174341 | A1 | 6/2020 | Shinobu | |
| 2021/0271055 | A1 | 9/2021 | Kuo et al. | |
| 2022/0390719 | A1 | 12/2022 | Kuo et al. | |
| 2023/0114678 | A1* | 4/2023 | Shinobu | G02B 23/14 |
| | | | | 359/715 |

FOREIGN PATENT DOCUMENTS

| TW | 201917440 | 5/2019 |
| TW | 201928423 | 7/2019 |
| TW | 202101064 | 1/2021 |

* cited by examiner

OPTICAL LENS AND DISPLAY DEVICE

CROSS-REFERENCE TO RELATED APPLICATION

This application claims the priority benefit of U.S. provisional application Ser. No. 63/318,782, filed on Mar. 11, 2022 and China application serial no. 202210591776.X, filed on May 27, 2022. The entirety of each of the above-mentioned patent applications is hereby incorporated by reference herein and made a part of this specification.

BACKGROUND

Technical Field

The invention relates to an optical lens and in particular to an optical lens used within a waveguide display device.

Description of Related Art

With the development of multimedia applications, such as stereoscopic display and virtual reality, a demand for high-resolution display devices is increasing.

A waveguide display device with a waveguide may be classified as having a self-luminous panel structure, a transmissive panel structure, or a reflective panel structure according to the type of image sources. An image beam generated by the image source (panel) forms a virtual image through an optical lens disposed in the waveguide display device, and the virtual image is further displayed at a preset position in front of a user's eyes. When the optical lens is applied in the waveguide display device, dimensions, weight, resolution, and thermal drift of the optical lens are important issues to be taken into consideration when designing the optical lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an optical lens with good optical quality and thermal stability.

Other objectives and advantages of the invention may further be learned from technical features disclosed in the invention.

In order to achieve one or a portion of or all of the objects or other objects, an embodiment of the invention provides an optical lens adapted to receive an image beam from an imaging element. The optical lens sequentially includes a first lens, a second lens, a third lens, and a fourth lens with refracting power along an optical axis from a light incidence side to a light exit side. Each of the first lens, the second lens, the third lens, and the fourth lens includes a light incidence surface facing the light incidence side and allowing the image beam to pass therethrough and a light exit surface facing the light exit side and allowing the image beam to pass therethrough. The refracting power of the first lens is positive. The refracting power of the second lens is negative. The refracting power of the third lens is positive. The first lens or the third lens is made of glass. The optical lens receives the image beam from the light incidence side. The image beam forms a stop on the light exit side, and the image beam forms the minimum beam cross-section at a location of the stop.

In order to achieve one or part or all of the above objects or other objects, an embodiment of the invention provides a display device that includes the optical lens, the imaging element, and a waveguide element. The imaging element is disposed on the light incidence side of the optical lens to provide the image beam. The waveguide element is disposed on the light exit side of the optical lens and has a light coupling inlet and a light coupling outlet. The image beam emitted from the imaging element passes through the optical lens and enters the waveguide element via the light coupling inlet, and the waveguide element guides the image beam, so that the image beam leaves the waveguide element via the light coupling outlet.

Based on the above, one or more embodiments of the invention have at least one of the following advantages or effects. In the optical lens and the display device provided in one or more embodiments of the invention, the optical lens includes the first lens, the second lens, the third lens, and the fourth lens, the refracting powers of the first lens, the second lens, and the third lens are positive, negative, and positive, and the first lens or the third lens is made of glass. Compared to a conventional optical lens, the optical lens provided in one or more embodiments of the invention is designed to be equipped with a relatively small 0.13-inch imaging element, so that the overall optomechanical volume may be reduced. The images with a spatial resolution of 125 lp/mm may be resolved by the optical lens, and the optical lens has a small amount of thermal drift and thus good optical performance. Besides, the number of the lenses of the optical lens provided herein is reduced to 4 as compared to the conventional optical lens having 5 lenses, which allows the reduction of the overall volume of the imaging module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
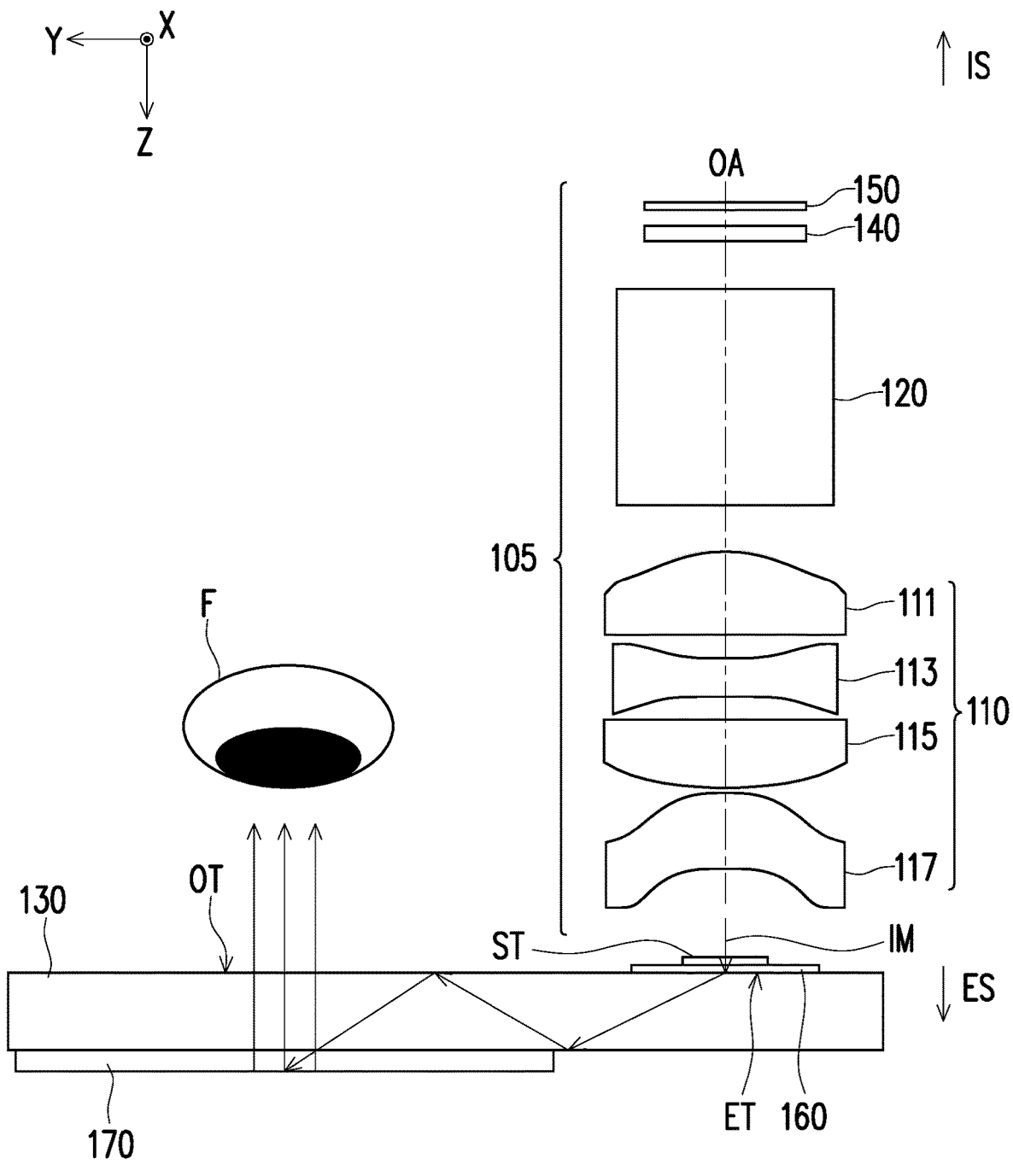
FIG. 1A is a schematic diagram of a display device according to an embodiment of the invention.

FIG. 1A is a schematic diagram of a display device according to an embodiment of the invention. With reference to FIG. 1A, a display device 100 including an optical lens 110, a waveguide element 130, and an imaging element 150 is provided in this embodiment. In this embodiment, the display device 100 is a head-mount display device, for instance, which should however not be construed as a limitation to the invention. The optical lens 110 is adapted to receive an image beam IM from the imaging element 110. Here, the optical lens 110 is a combination of a plurality of optical lenses on different optical conditions, which will be elaborated in the following paragraphs. The imaging element 150 is disposed on a light incidence side IS of the optical lens 110 and provides the image beam IM. The waveguide element 130 is disposed on a light exit side ES of the optical lens 110, wherein the light incidence side IS and the light exit side ES are two opposite sides of the optical lens 110. Besides, the waveguide element 130 has a first surface and a second surface (not shown) opposite to each other and has a light coupling inlet ET and a light coupling outlet OT. The light coupling inlet ET and the light coupling outlet OT are, for instance, surface areas where the image beam IM coming from the optical lens 110 enters the waveguide element 130 and where the image beam IM leaves the waveguide element 130, respectively. In the present embodiment, both the light coupling inlet ET and the light coupling outlet OT are located on the first surface of the waveguide element 130. The image beam IM from the imaging element 150 passes through the optical lens 110 and then enters the waveguide element 130 via the light coupling inlet ET of the first surface, and the image beam IM is transmitted in the waveguide element 130 and finally leaves the waveguide element 130 via the light coupling outlet OT of the first surface. The image beam IM is then projected to a target F, which is, for instance, eyes of a user using the head-mounted display device. Here, the image beam IM forms a stop ST on the light exit side ES of the optical lens 110, and the image beam IM forms a minimum cross-section at a location of the stop ST. For instance, in the present embodiment, a diameter of the minimum cross-section of the image beam IM is 3.7 millimeters (mm). Therefore, the image beam IM converges to the location of the stop ST after passing through the optical lens 110 and diverges after passing through the stop ST. Specifically, in the present embodiment, the stop ST is located at or near the light coupling inlet ET of the waveguide element 130. On a reference plane defined by an x axis and a y axis, the stop ST is, for instance, substantially circular in shape, and a dimension of a diameter of the stop ST in an x-axis direction is substantially the same as a dimension of a diameter of the stop ST in a y-axis direction.

Figure 1B:
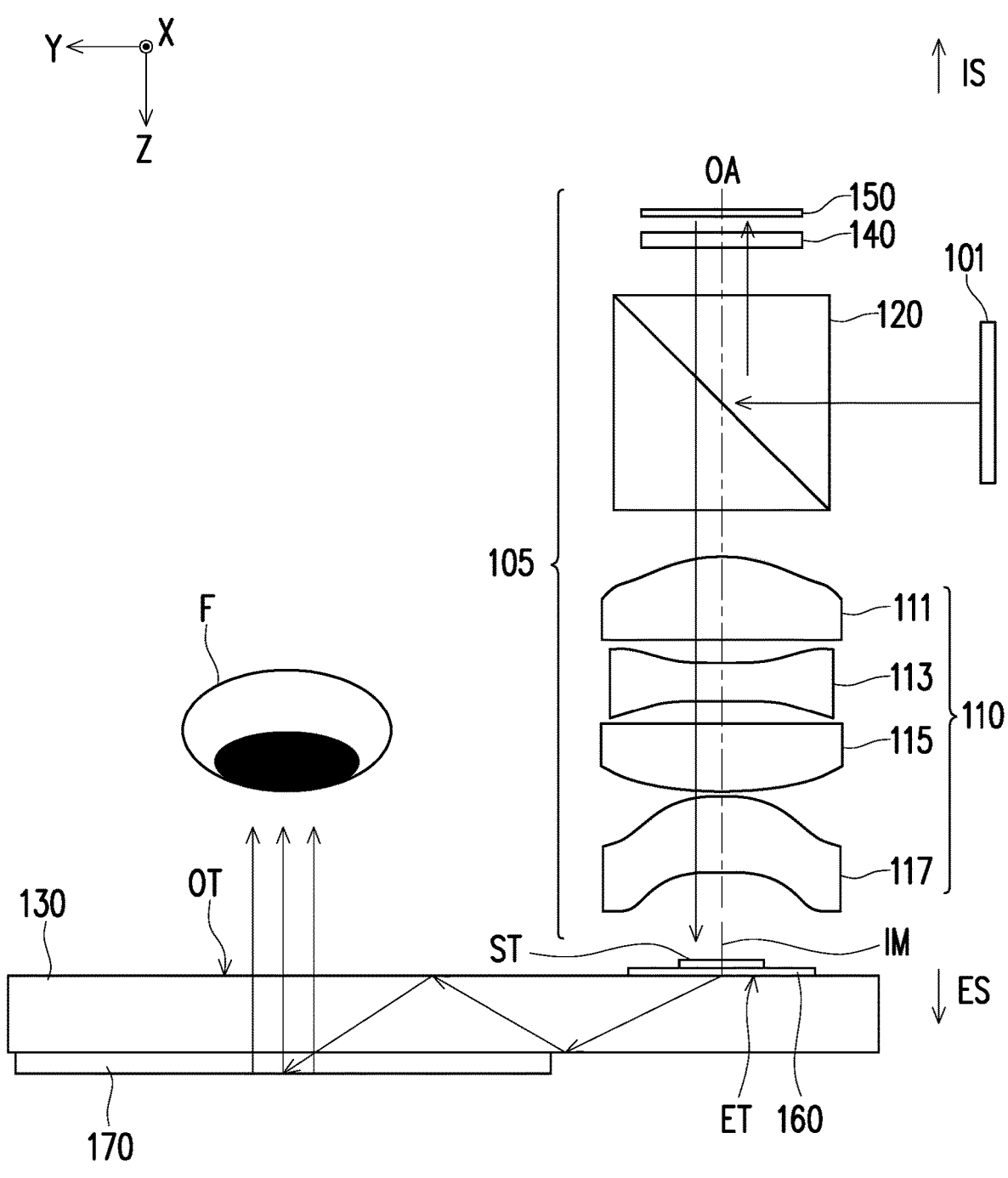
FIG. 1B is a schematic diagram of a display device according to another embodiment of the invention.

Particularly, in the present embodiment, the display device 100 further includes a prism 120, a glass cover 140, an anti-reflection element 160, and a reflection element 170, wherein the optical lens 110, the prism 120, the glass cover 140, and the imaging element 150 may be collectively referred to as an imaging module 105. The prism 120 is disposed on the transmission path of the image beam IM and disposed between the imaging element 150 and the optical lens 110. The image beam IM provided by the imaging element 150 passes through the prism 120 and enters the optical lens 110. The imaging element 150 is disposed on the light incidence side IS of the optical lens 110. In the present embodiment, the imaging element 150 may be a display device capable of providing the image beam such as an organic light emitting diode (OLED) panel or a micro light emitting diode (micro-LED) panel. In another embodiment, the imaging element 150 may be composed of a red micro-LED panel, a green micro-LED panel, and a blue micro-LED panel, and the prism 120 is, for instance, an X prism configured to combine color beams emitted by the micro-LED panels of three different colors to form the image beam. In the present embodiment, the imaging element 150 refers to a 0.13-inch micro-LED panel with a diagonal length of 3.2 mm. FIG. 1B is a schematic diagram of a display device according to another embodiment of the invention. In FIG. 1B, the display device 100 may further include an illumination light source 101, and the imaging element 150 is a reflective-type image source. The illumination light source 101 generates an illumination beam; after the illumination beam is guided by the optical element (e.g., the prism 120) to the imaging element 150, the illumination beam is reflected by the imaging element 150 and forms the image beam IM. For instance, the imaging element 150 is, for instance, a reflective optical modulator, such as a liquid crystal on silicon (LCoS) panel, a digital micromirror device (DMD), and so on, which should however not be construed as a limitation to the invention. The configuration of the imaging element 150 and the type thereof are not limited in the invention. The glass cover 140 is disposed between the imaging element 150 and the prism 120 and is configured to protect the imaging element 150 from the influence of dust.

On the other hand, an anti-reflection element 160 is disposed at the light coupling inlet ET of the waveguide element 130, wherein the anti-reflection element 160 may be, for instance, an anti-reflection layer which is coated onto the first surface of the waveguide element 130 and corresponds to the light coupling inlet ET, or the anti-reflection element 160 may be an anti-reflection structure which is formed by performing surface treatment on the first surface of the waveguide element 130 and corresponds to the area of the light coupling inlet ET. The anti-reflection element 160 is configured to allow the image beam IM to easily enter the waveguide element 130, and the ratio of the image beam IM reflected by a surface (the first surface) of the waveguide element 130 may be reduced. A reflection element 170 is arranged on a second surface of the waveguide element 130 and corresponds to the location of the light coupling outlet OT, wherein the reflection element 170 may be, for instance, a reflection film layer which is coated onto the second surface of the waveguide element 130 and corresponds to the light coupling outlet OT, or the reflection element 170 may be a reflection structure formed by performing surface treatment on the second surface of the waveguide element 130. The reflection element 170 may reflect the image beam IM transmitted in the waveguide element 130 and image beam IM reflected by the reflection element 170 is transmitted towards the light coupling outlet OT, and the reflection element 170 is configured to allow the image beam IM in the waveguide element 130 to easily leave the waveguide element 130.

Figure 2:
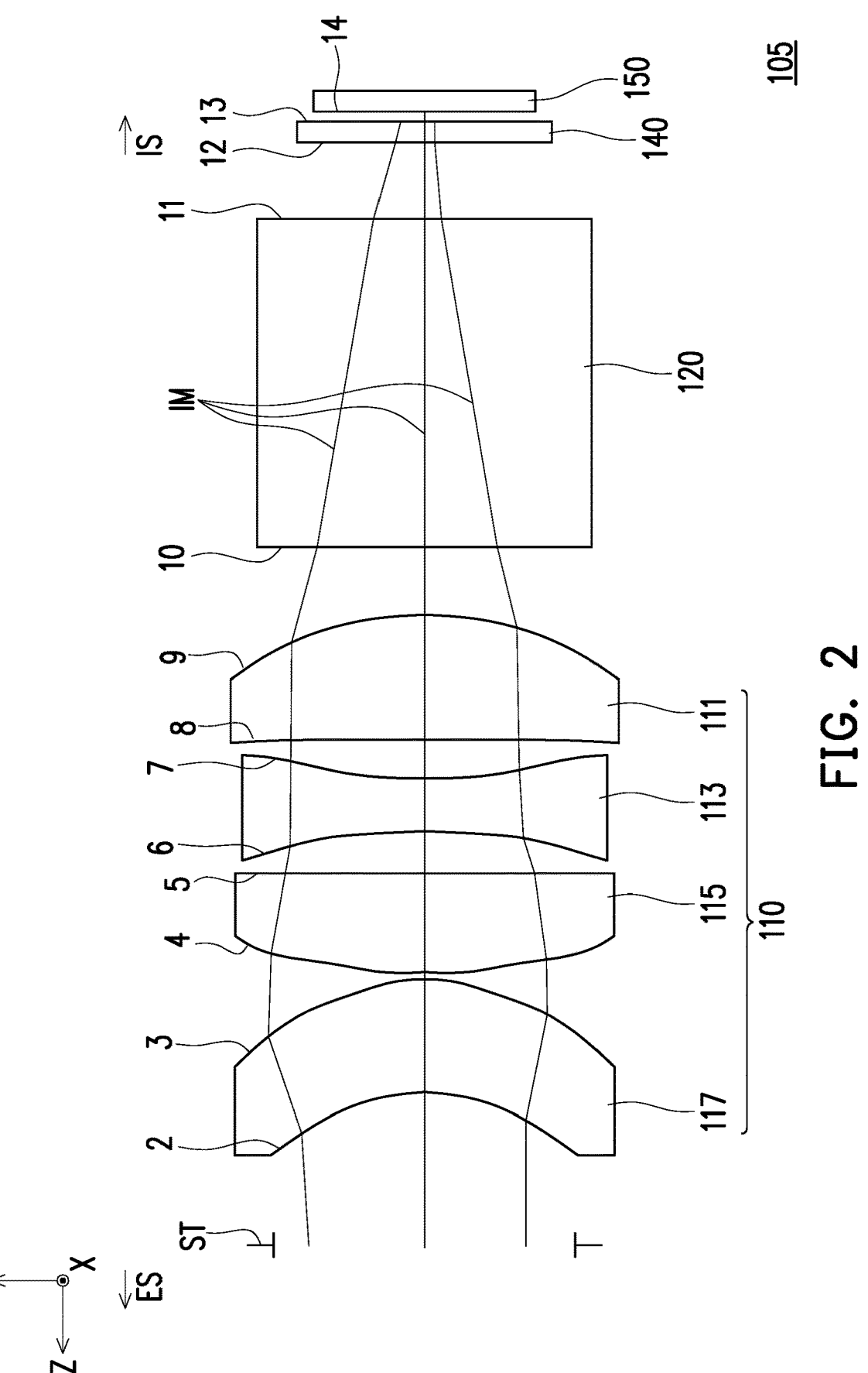
FIG. 2 is a schematic diagram of an imaging module according to a first embodiment of the invention.

FIG. 2 is a schematic diagram of an imaging module according to a first embodiment of the invention. Please refer to FIG. 1A, FIG. 1B, and FIG. 2. The imaging module 105 shown in FIG. 2, FIG. 7, and FIG. 12 may at least be applied to the display device 100 shown in FIG. 1A or FIG. 1B. Therefore, the imaging module 105 shown in FIG. 2 serves an example for explanation below. In the first embodiment of the imaging module 105, the optical lens 110 sequentially includes a first lens 111, a second lens 113, a third lens 115, and a fourth lens 117 respectively with a refracting power along an optical axis OA from the light incidence side IS to the light exit side ES. Each of the first lens 111 to the fourth lens 117 includes a light incidence surface 9, 7, 5, and 3 facing the light incidence side IS and allowing the image beam IM to pass therethrough and a light exit surface 8, 6, 4, and 2 facing the light exit side ES and allowing the image beam IM to pass therethrough. In addition, the glass cover 140 and the prism 120 in the imaging module 105 have light incidence surfaces 13 and 11 and light exit surfaces 12 and 10, respectively, and the imaging element 150 has an imaging surface 14.

The refracting power of the first lens 111 is positive. A material of the first lens 111 is plastic. The light incidence surface 9 of the first lens 111 is a convex surface protruding toward the imaging element 150. The light exit surface 8 of the first lens 111 is a concave surface facing the stop ST. In the present embodiment, both the light incidence surface 9 and the light exit surface 8 of the first lens 111 are aspheric surfaces, which should however not be construed as a limitation to the invention.

The refracting power of the second lens 113 is negative. A material of the second lens 113 is plastic. The light incidence surface 7 of the second lens 113 is a concave surface facing the imaging element 150. The light exit surface 6 of the second lens 113 is a concave surface facing the stop ST. In the present embodiment, both the light incidence surface 7 and the light exit surface 6 of the second lens 113 are aspherical surfaces, which should however not be construed as a limitation to the invention.

The refracting power of the third lens 115 is positive. A material of the third lens 115 is glass. The light incidence surface 5 of the third lens 115 is a concave surface facing the imaging element 150. The light exit surface 4 of the third lens 115 is a convex surface protruding toward the stop ST. In the present embodiment, both the light incidence surface 5 and the light exit surface 4 of the third lens 115 are aspherical surfaces, which should however not be construed as a limitation to the invention.

The refracting power of the fourth lens 117 is positive. A material of the fourth lens 117 is plastic. The light incidence surface 3 of the fourth lens 117 is a convex surface protruding toward the imaging element 150. The light exit surface 2 of the fourth lens 117 is a concave surface facing the stop ST. In the present embodiment, both the light incidence surface 3 and the light exit surface 2 of the fourth lens 117 are aspherical surfaces, which should however not be construed as a limitation to the invention.

Other detailed optical data provided in the first embodiment are shown in Table 1 below, wherein the optical lens 110 provided in the first embodiment has an effective focal length (EFL) of 6.01 mm, a half viewing angle of 15 degrees, and an image height of 1.6 mm. It should be noted that a curvature radius of the light incidence surface 9 shown in Table 1 refers to a curvature radius of the light incidence surface 9 of the first lens 111 in a region where the optical axis is located, a curvature radius of the light exit surface 8 refers to a curvature radius of the light exit surface 8 of the first lens 111 in the region where the optical axis is located, and the rest may be deduced by analogy. A distance of the light incidence surface 9 (0.93 mm as shown in Table 1) refers to a distance between the light incidence surface 9 and the next surface (e.g., the light exit surface 10 of the prism 120 in this embodiment) on the optical axis OA, i.e., the distance between the first lens 111 and the prism 120 on the optical axis OA is 0.93 mm. A distance of the light exit surface 8 (1.74 mm as shown in Table 1) refers to a distance between the light exit surface 8 and the light incident surface 9 on the optical axis OA, i.e., the thickness of the first lens 111 on the optical axis OA is 1.74 mm, and the rest may be deduced by analogy.

TABLE 1

| | | First embodiment | | | |
| | | EFL = 6.01 mm, half viewing angle = 15°, image height = 1.6 mm. | | | |
| Element | Surface | Curvature radius(mm) | Distance (mm) | Refractive index | Abbe number |
|---|---|---|---|---|---|
| Virtual image | | Infinite | Infinite | | |
| Stop ST | | Infinite | 2.11 | | |
| Fourth lens | Light exit surface 2 | −1.99 | 1.54 | 1.53 | 55.9 |
| 117 | Light incidence surface 3 | −2.17 | 0.06 | | |
| Third lens | Light exit surface 4 | 5.47 | 1.30 | 1.86 | 37.0 |
| 115 | Light incidence surface 5 | 29.59 | 0.62 | | |
| Second lens | Light exit surface 6 | −8.17 | 0.75 | 1.66 | 20.3 |
| 113 | Light incidence surface 7 | 5.29 | 0.43 | | |
| First lens | Light exit surface 8 | 41.39 | 1.74 | 1.53 | 55.9 |
| 111 | Light incidence surface 9 | −3.44 | 0.93 | | |
| Prism | Light exit surface 10 | Infinite | 4.5 | 1.51 | 64.1 |
| 120 | Light incidence surface 11 | Infinite | 1.07 | | |
| Glass cover | Light exit surface 12 | Infinite | 0.3 | 1.50 | 61.1 |
| 140 | Light incidence surface 13 | Infinite | 0.01 | | |
| Imaging element 150 | Imaging plane 14 | Infinite | | | |

It is also worth noting that in the optical lens 110 provided in the first embodiment, a focal length of the optical lens 110 is 6.01 mm, a focal length of the glass lens (i.e., the third lens 115) is 7.54 mm, an abbe number of the glass lens (i.e., the third lens 115) is 37.09, and the fourth lens 117 closest to the stop ST has a focal length of 22.41 mm. In other words, the optical lens 110 provided in the first embodiment satisfies the following conditions:

$$0.5 < fg/f < 3;$$

$$Vg > 30; \text{ and}$$

$$|fs/f| > 1.$$

Here, fg is the EFL of the glass lens in the optical lens 110;

f is the EFL of the optical lens 110;

Vg is the abbe number of the glass lens in the optical lens 110; and fs is the EFL of the fourth lens 117 of the optical lens 110 closest to the stop ST.

In the present embodiment, the total eight surfaces, i.e., the light incidence surfaces 9, 7, 5, and 3 and the light exit surfaces 8, 6, 4, and 2 are all aspherical surfaces, and these aspherical surfaces are defined by the following formula:

$$Z(Y) = \frac{Y^2}{R} \Bigg/ \left(1 + \sqrt{1 - (1+K)\frac{Y^2}{R^2}}\right) + \sum_{k=1}^{n} a_{2i} \times Y^{2i} \qquad (1)$$

Y is the distance between a point on a curve on the aspheric surface and the optical axis;

Z is a depth of the aspheric surface, i.e., a vertical distance between a point on the aspheric surface whose distance to the optical axis is Y and a tangent plane tangent to a vertex on the optical axis of the aspheric surface;

R is the curvature radius of the lens surface;

K is a conic constant;

$a_{2i}$ is the 2i-th-order aspheric coefficient.

In this embodiment, the aspheric coefficients of the above aspheric surfaces in formula (1) are shown in Table 2 below. Here, the column number 9 in Table 2 indicates the aspherical coefficients of the light incidence surface 9 of the first lens 111, and other columns may be deduced by analogy. In the present embodiment, the 2i-th-order aspheric coefficient $a_2$ of each aspheric surface is zero and thus is not listed in the table.

TABLE 2

| Surface | K | $a_4$ | $a_6$ | $a_8$ | $a_{10}$ | $a_{12}$ | $a_{14}$ |
|---|---|---|---|---|---|---|---|
| 2 | −7.78E−001 | 6.18E−003 | 5.41E−004 | −3.47E−005 | −8.13E−005 | 1.79E−005 | 2.27E−007 |
| 3 | −1.43E−000 | −1.57E−003 | 7.24E−006 | −3.53E−005 | 5.68E−008 | 4.49E−008 | 1.81E−007 |
| 4 | 0 | −7.39E−005 | −5.97E−005 | −1.13E−005 | 7.63E−007 | 3.89E−007 | 1.09E−008 |
| 5 | 0 | −5.24E−004 | 9.08E−006 | 2.49E−005 | −1.27E−006 | −2.75E−007 | 1.00E−007 |
| 6 | −4.84E−001 | −1.26E−002 | 2.20E−003 | −3.78E−004 | 3.41E−005 | 1.01E−006 | −3.30E−007 |
| 7 | −9.63E−000 | −4.62E−003 | 1.94E−004 | 2.46E−005 | −7.64E−006 | −2.25E−007 | 1.28E−007 |
| 8 | 0 | 2.31E−003 | −2.36E−003 | 4.72E−004 | −4.67E−005 | −5.73E−007 | 2.54E−007 |
| 9 | 0 | 4.39E−003 | −8.88E−004 | 2.20E−004 | −2.99E−005 | 2.40E−006 | −1.15E−007 |

When the ambient temperature provided in the first embodiment is 0° C., 10° C., 20° C., 30° C., and 40° C., respectively, the values of the temperatures (° C.) of the first lens 111, the second lens 113, the third lens 115, and the fourth lens 117 of the optical lens 110 are shown in Table 3 below. Moreover, when the optical lens 110 provided in the first embodiment is applied in thermal equilibrium within the ambient temperature range from 0° C. to 40° C. without re-adjusting the focal length thereof, the back focus of the optical lens has a thermal drift less than 0.01 mm corresponding to the center point of the projection image.

TABLE 3

| Ambient temperature | Fourth lens 117 | Third lens 115 | Second lens 113 | First lens 111 |
|---|---|---|---|---|
| 0 | 8 | 11 | 16 | 19 |
| 10 | 18 | 21 | 26 | 29 |
| 20 | 28 | 31 | 36 | 39 |
| 30 | 38 | 41 | 46 | 49 |
| 40 | 48 | 51 | 56 | 59 |

Figure 3:
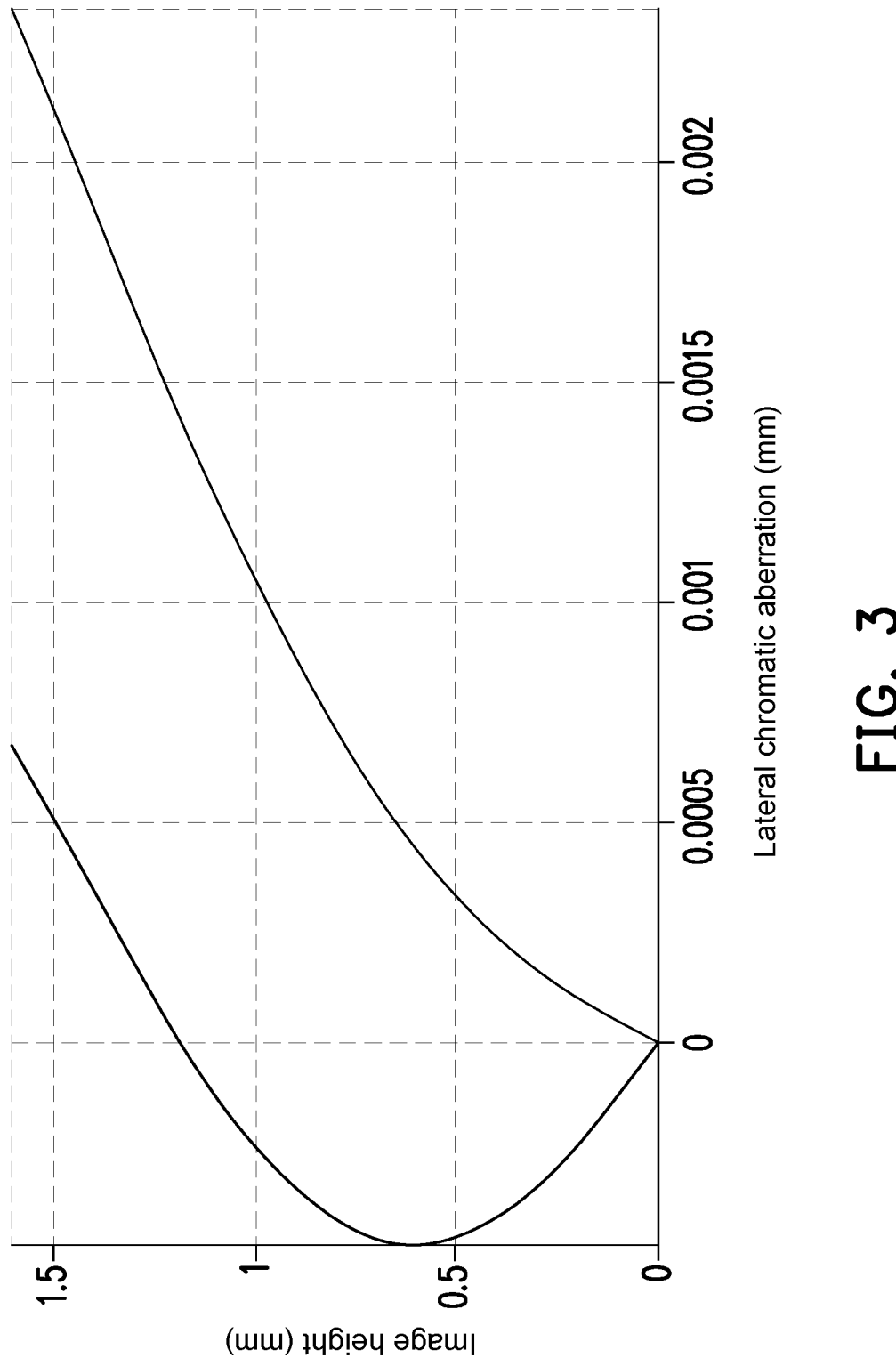
FIG. 3 is a schematic diagram illustrating lateral chromatic aberration of the optical lens depicted in FIG. 2.
Figure 4:
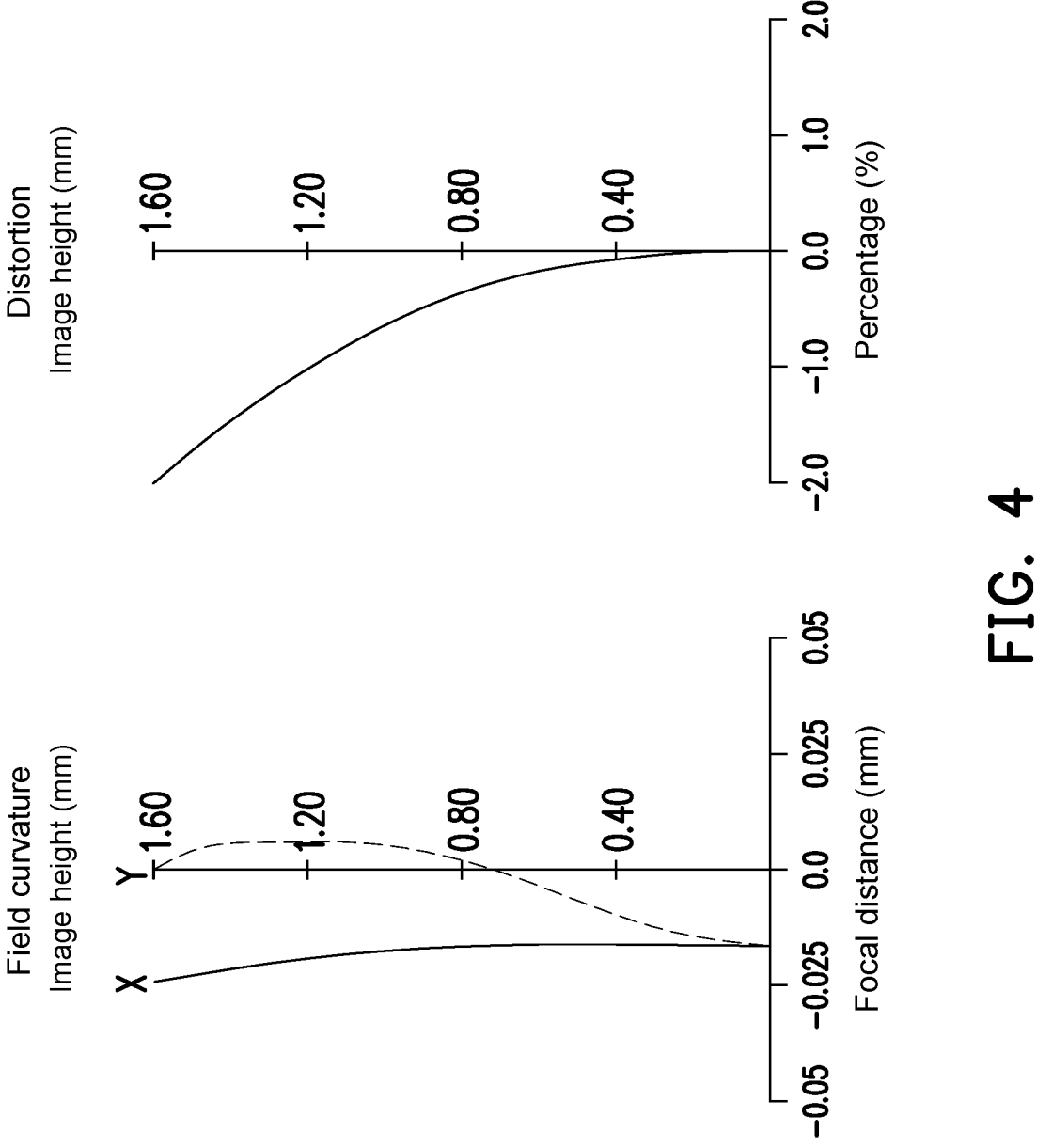
FIG. 4 is a schematic diagram illustrating astigmatic field curvature and distortion of the optical lens depicted in FIG. 2.
Figure 5:
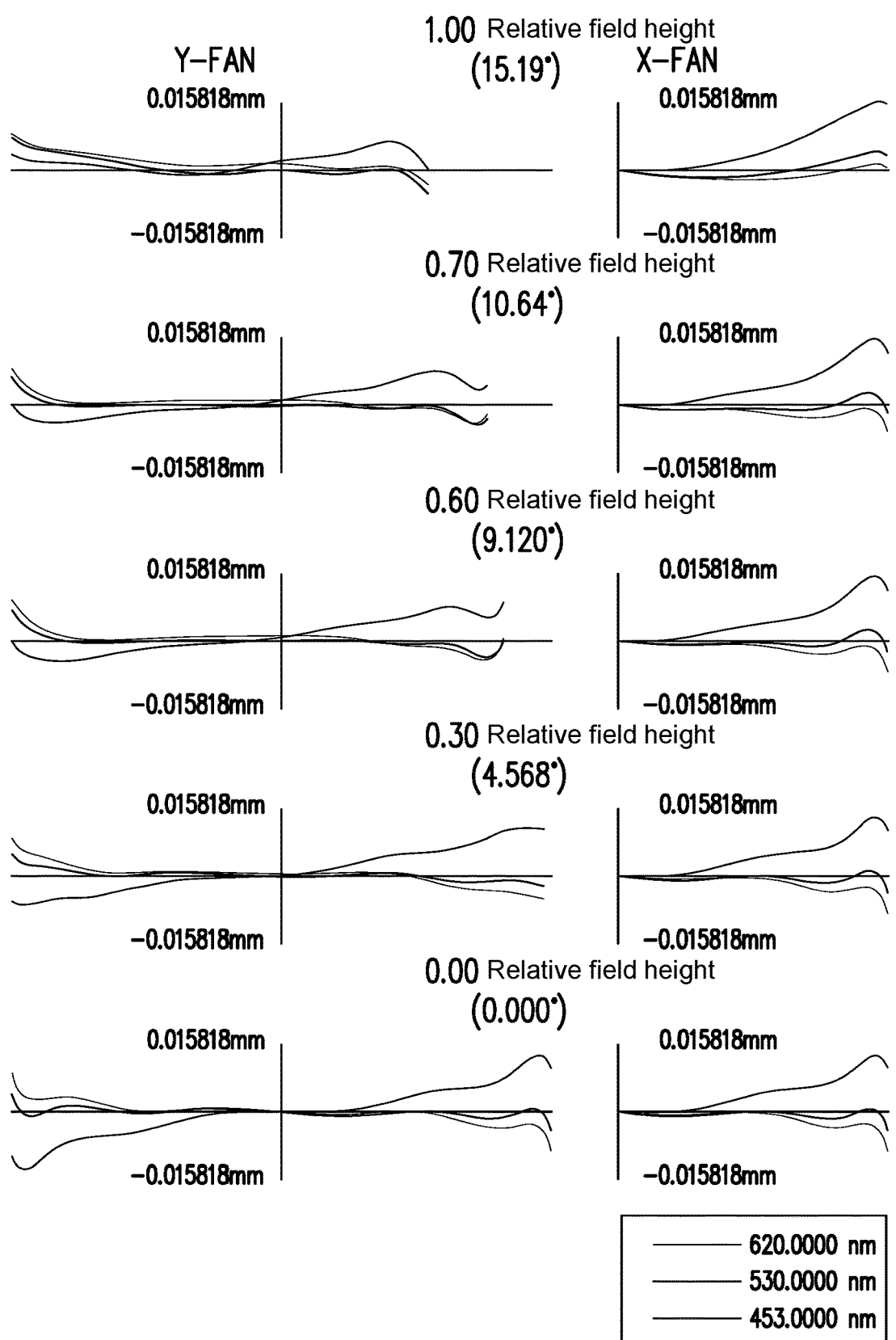
FIG. 5 is a schematic diagram illustrating transverse ray fan plots of the optical lens depicted in FIG. 2.
Figure 6A:
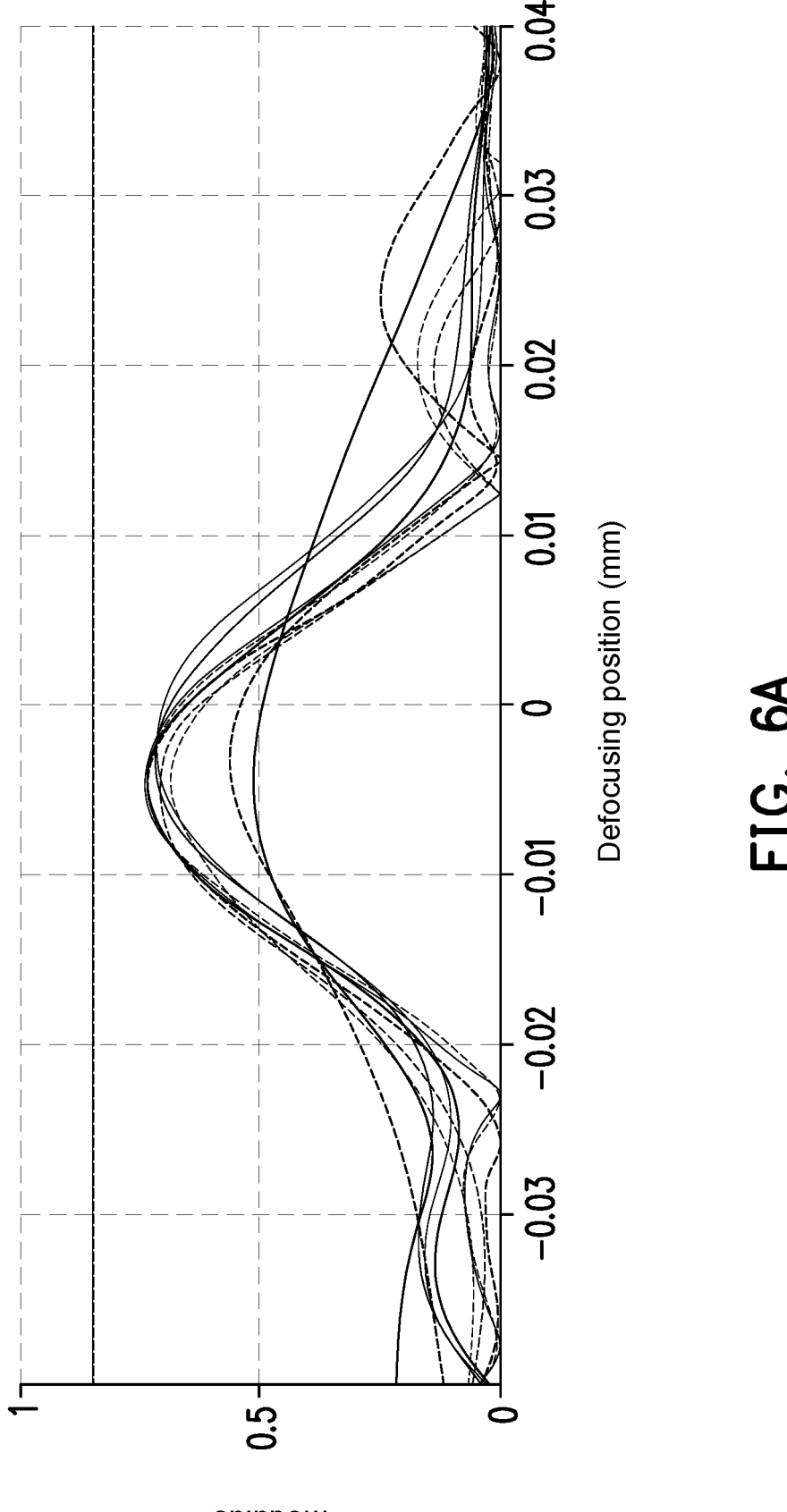
FIG. 6A to FIG. 6F are modulation transfer function (MTF) curves of the optical lens depicted in FIG. 2 at different temperatures.
Figure 6B:
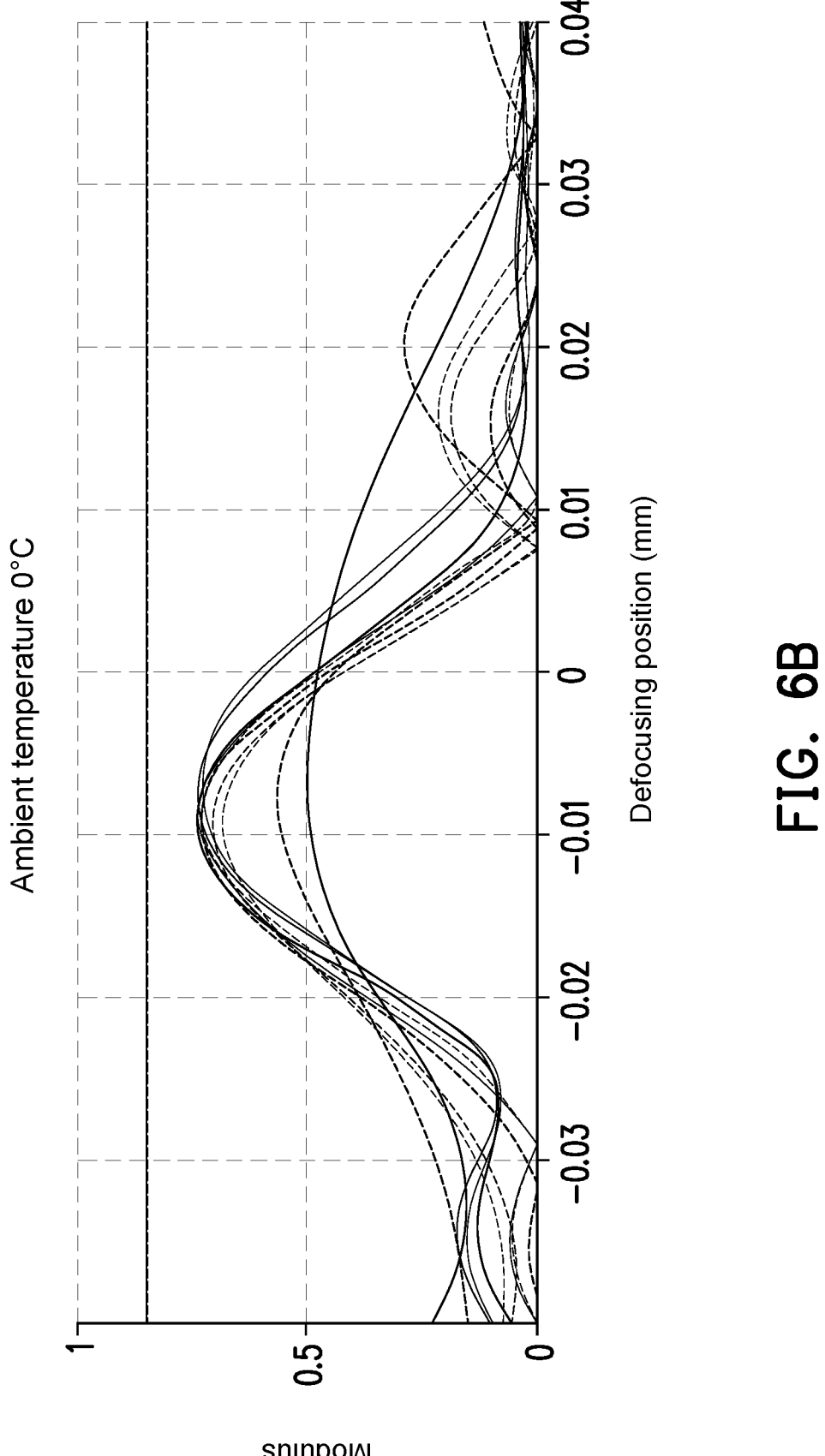
Figure 6C:
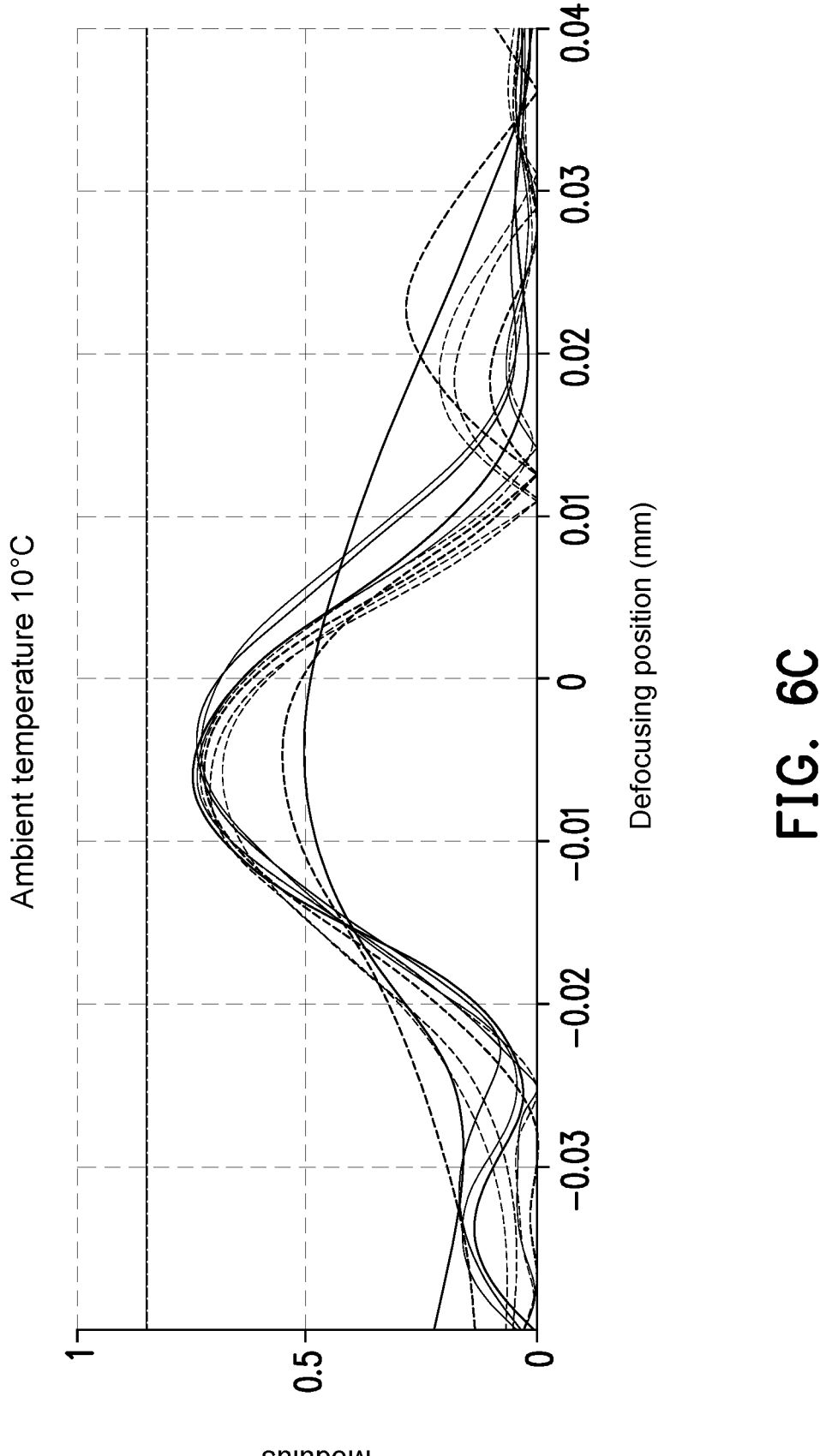
Figure 6D:
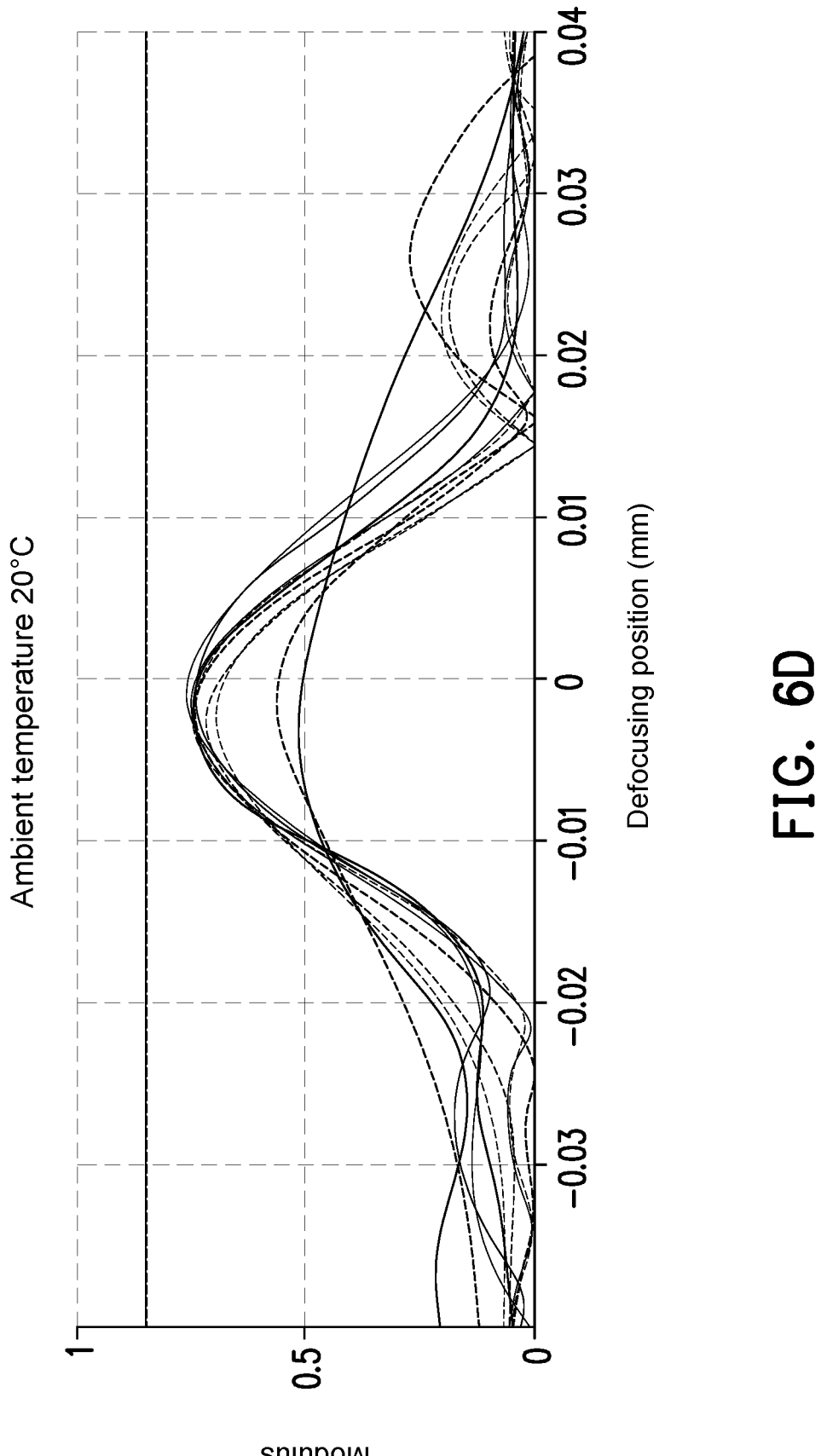
Figure 6E:
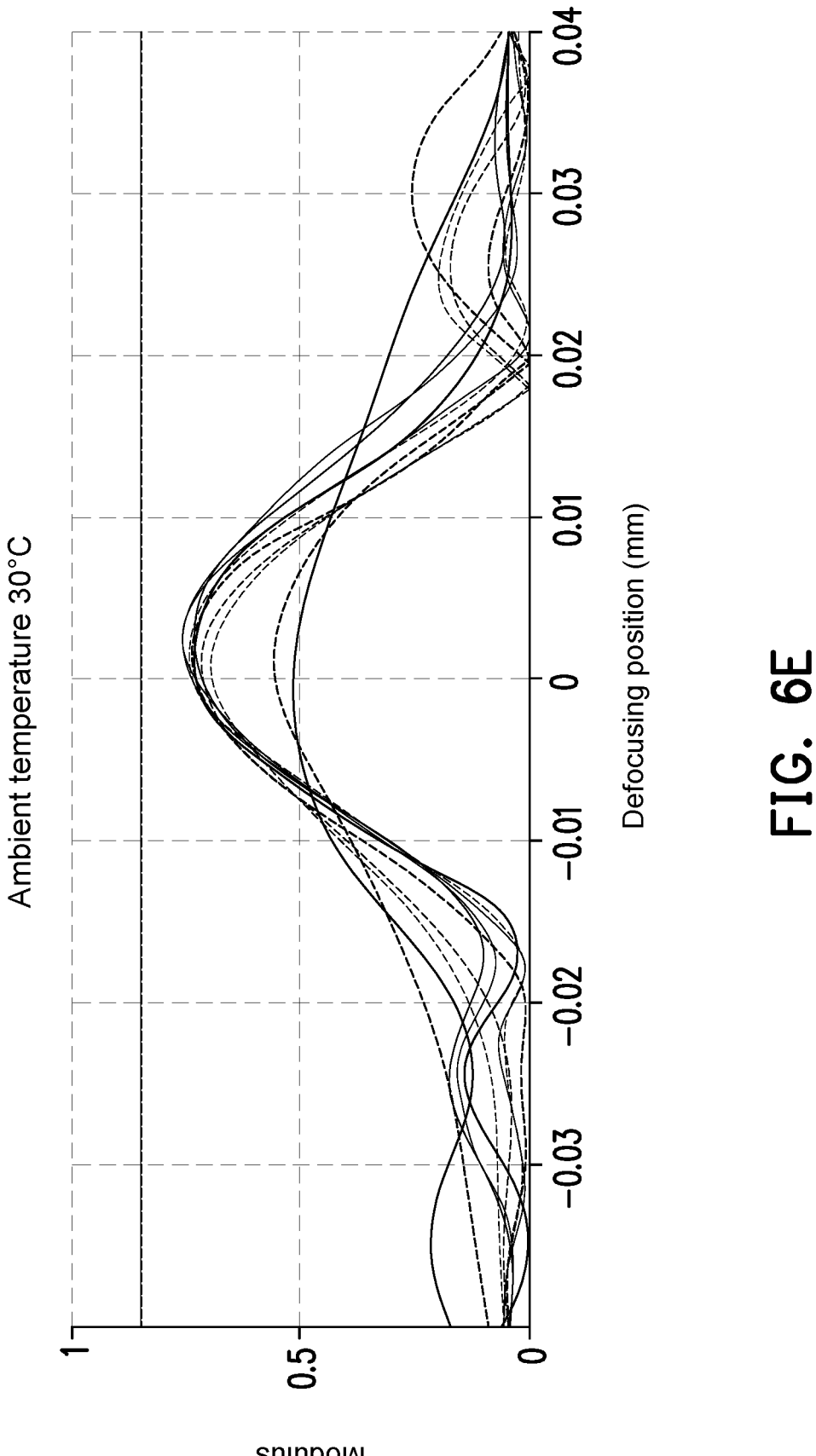
Figure 6F:
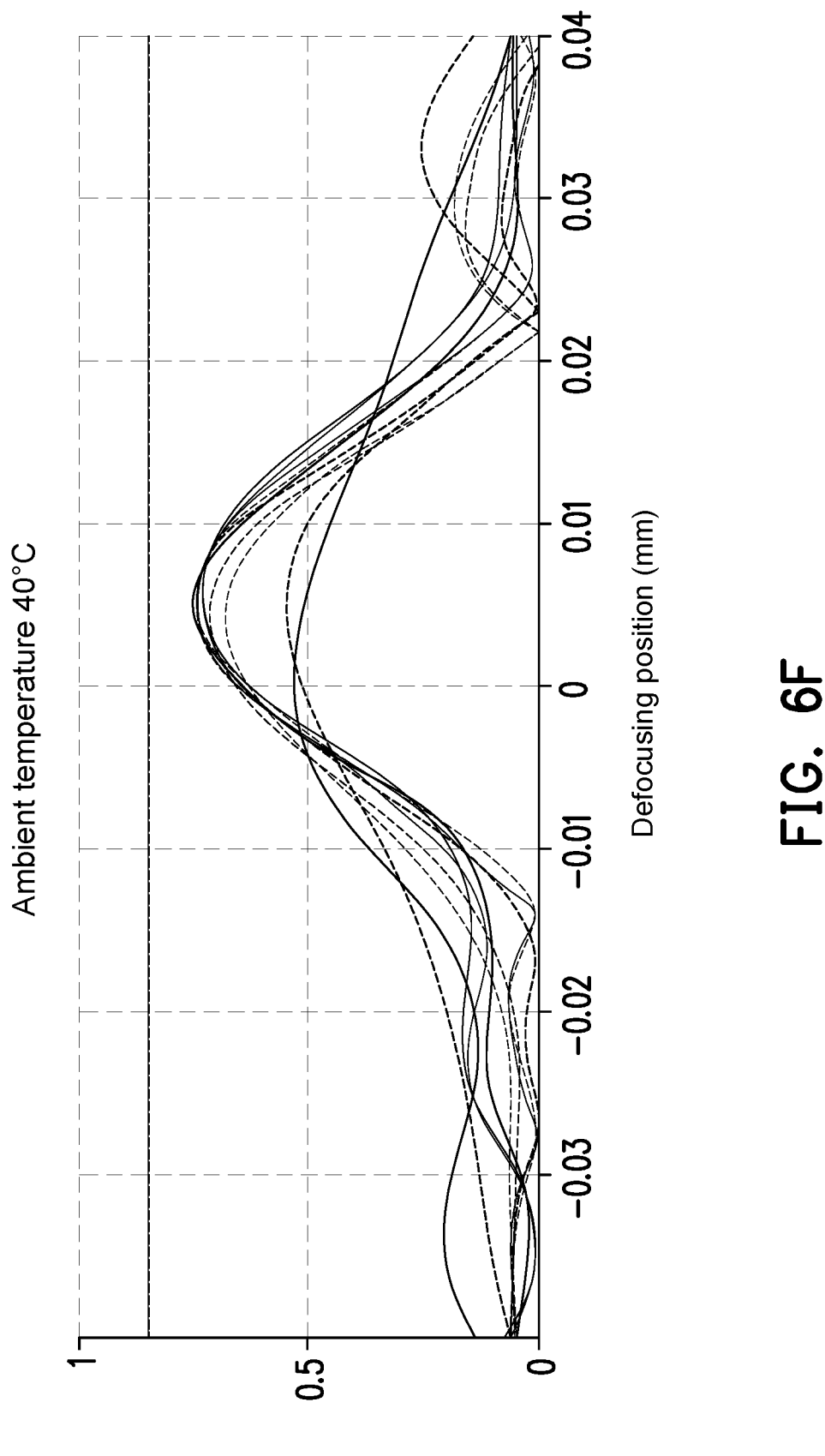

FIG. 3 is a schematic diagram illustrating lateral chromatic aberration of the optical lens depicted in FIG. 2. FIG. 4 is a schematic diagram illustrating astigmatic field curvature and distortion of the optical lens depicted in FIG. 2. FIG. 5 is a schematic diagram illustrating transverse ray fan plots of the optical lens depicted in FIG. 2. FIG. 6A to FIG. 6F are modulation transfer function (MTF) curves of the optical lens depicted in FIG. 2 at different temperatures. With reference to FIG. 3 to FIG. 6F, FIG. 3 illustrates the lateral chromatic aberration of the optical lens 110 according to the first embodiment. FIG. 4 illustrates the field curvature aberration in a sagittal direction (marked as X), the field curvature aberration in a tangential direction (marked as Y), and distortion aberration of the optical lens 110 according to the first embodiment when a reference wavelength is 530 nanometers (nm). FIG. 5 illustrates the transverse ray fan plots of the optical lens 110 according to the first embodiment and is a graph of simulated data while the wavelengths are respectively 453 nm, 530 nm, and 620 nm. FIG. 6A to FIG. 6F are MTF curves of the optical lens provided in the first embodiment at different temperatures, respectively. In this embodiment, it can be seen from FIG. 3 that the chromatic aberration between the wavelengths is small and the performance of the optical lens 100 is favorable in terms of chromatic aberration. It can be seen from FIG. 4 that the field curvature aberration of the optical lens 110 provided in this embodiment falls within ±0.025 mm, indicating that the optical lens 110 provided in the first embodiment may effectively eliminate aberration. The distortion aberration diagram shows that the distortion aberration is maintained within a range of ±2%, indicating that the distortion aberration provided in the first embodiment satisfies the imaging quality requirements of the optical lens 110, and the optical lens 110 may provide good imaging quality.

Besides, compared to the conventional lens, the optical lens 110 provided in this embodiment is designed to be equipped with the relatively small 0.13-inch imaging element 150 to reduce the overall volume of the imaging module 105. In addition, an output viewing angle of the optical lens 110 may reach 30 degrees and improve the resolution to 125 lp/mm. Moreover, reducing the number of lenses of the optical lens 110 from the conventional 5 lenses to 4 lenses allows the reduction of the overall volume of the imaging module 105.

In order to fully illustrate various implementation aspects of the Invention, other embodiments of the Invention will be described below. It should be noticed that reference numbers of the elements and a part of contents of the aforementioned embodiment are also used in the following embodiments, where the same reference numbers denote the same or like components, and descriptions of the same technical contents are omitted. The aforementioned embodiment may be referred for descriptions of the omitted parts, and detailed descriptions thereof are not repeated in the following embodiments. The aforementioned embodiment may be referred for descriptions of the omitted parts, and detailed descriptions thereof are not repeated in the following embodiment.

Figure 7:
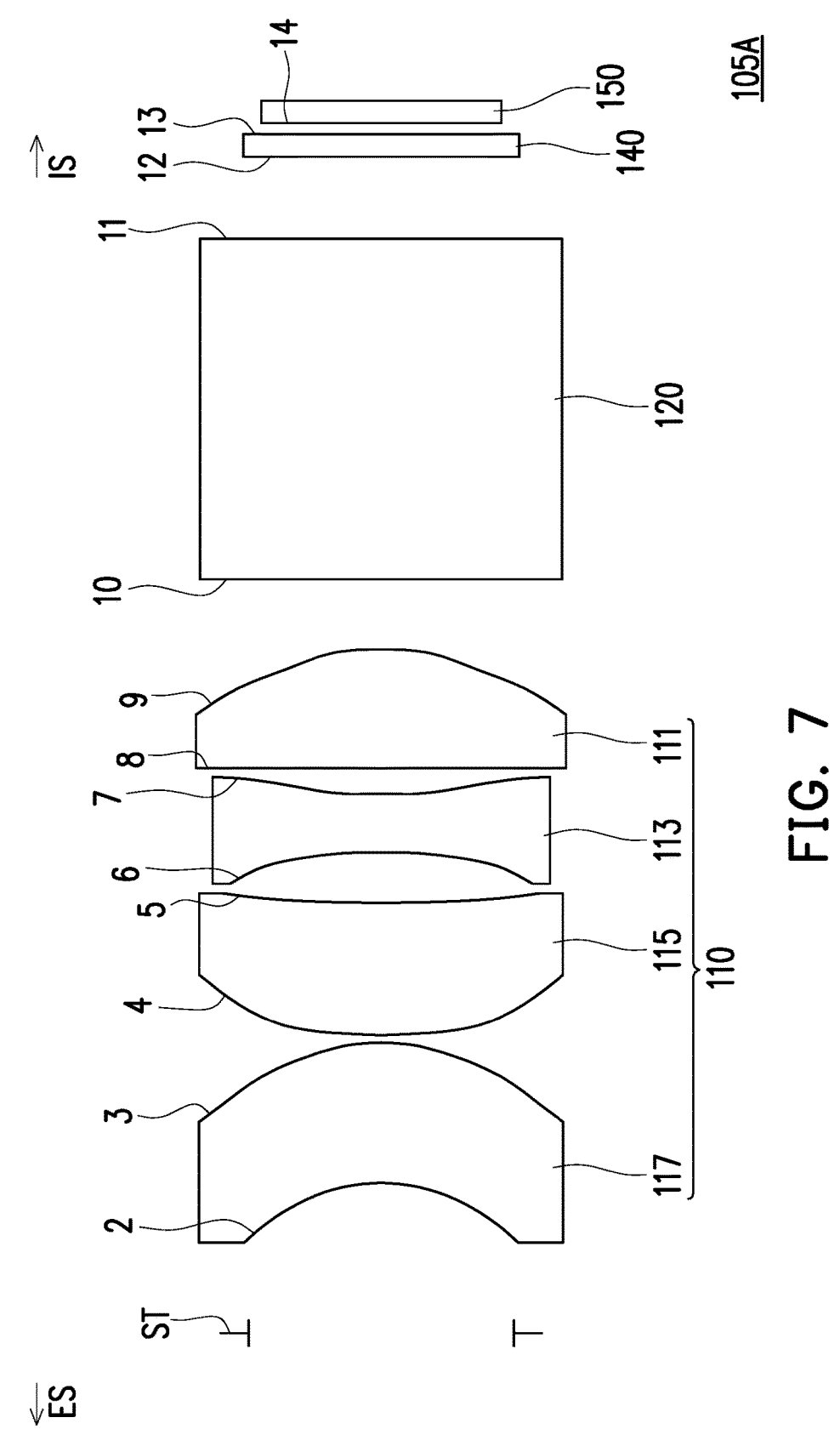
FIG. 7 is a schematic diagram of an imaging module according to a second embodiment of the invention.

FIG. 7 is a schematic diagram of an imaging module according to a second embodiment of the invention. With reference to FIG. 7, the imaging module 105A provided in the second embodiment is substantially similar to the imaging module 105 provided in the first embodiment, while the differences between the two are described as follows. Specifically, each optical data of the optical lens 110, the aspherical coefficients, and the parameters of the lenses 111, 113, 115, and 117 are more or less different. Besides, in the present embodiment, the refracting power of the fourth lens 117 is negative. Other detailed optical data provided in the second embodiment are shown in Table 4 below.

TABLE 4

Second embodiment

EFL = 6.12 mm, half viewing angle = 15°, image height = 1.6 mm.

| Element | Surface | Curvature radius(mm) | Distance (mm) | Refractive index | Abbe number |
|---|---|---|---|---|---|
| Virtual image | | Infinite | Infinite | | |
| Stop ST | | Infinite | 1.95 | | |
| Fourth lens | Light exit surface 2 | −2.01 | 1.84 | 1.53 | 55.9 |
| 117 | Light incidence surface 3 | −2.69 | 0.06 | | |
| Third lens | Light exit surface 4 | 4.40 | 1.77 | 1.80 | 40.9 |
| 115 | Light incidence surface 5 | 37.46 | 0.64 | | |
| Second lens | Light exit surface 6 | −10.52 | 0.75 | 1.66 | 20.3 |
| 113 | Light incidence surface 7 | 4.46 | 0.35 | | |
| First lens | Light exit surface 8 | 41.39 | 1.55 | 1.53 | 55.9 |
| 111 | Light incidence surface 9 | −3.51 | 0.85 | | |
| Prism | Light exit surface 10 | Infinite | 4.5 | 1.51 | 64.1 |
| 120 | Light incidence surface 11 | Infinite | 1.07 | | |
| Glass cover | Light exit surface 12 | Infinite | 0.3 | 1.50 | 61.1 |
| 140 | Light incidence surface 13 | Infinite | 0.01 | | |

TABLE 4-continued

| Second embodiment EFL = 6.12 mm, half viewing angle = 15°, image height = 1.6 mm. | | | | | |
|---|---|---|---|---|---|
| Element | Surface | Curvature radius(mm) | Distance (mm) | Refractive index | Abbe number |
| Imaging element 150 | Imaging plane 14 | Infinite | | | |

It is also worth noting that in the optical lens 110 provided in the second embodiment, the focal length of the optical lens 110 is 6.12 mm, the focal length of the glass lens (i.e., the third lens 115) is 6 mm, the abbe number of the glass lens (i.e., the third lens 115) is 40.9, and the fourth lens 117 closest to the stop ST has the focal length of −300 mm. In other words, the optical lens 110 provided in the second embodiment also satisfies the three conditions satisfied by the optical lens 110 depicted in FIG. 1A.

In this embodiment, the aspheric coefficients of the above-aspheric surfaces in formula (1) are shown in Table 5 below. In the present embodiment, the 2i-th-order aspheric coefficient $a_2$ of each aspheric surface is zero and thus is not listed in the table.

Figure 8:
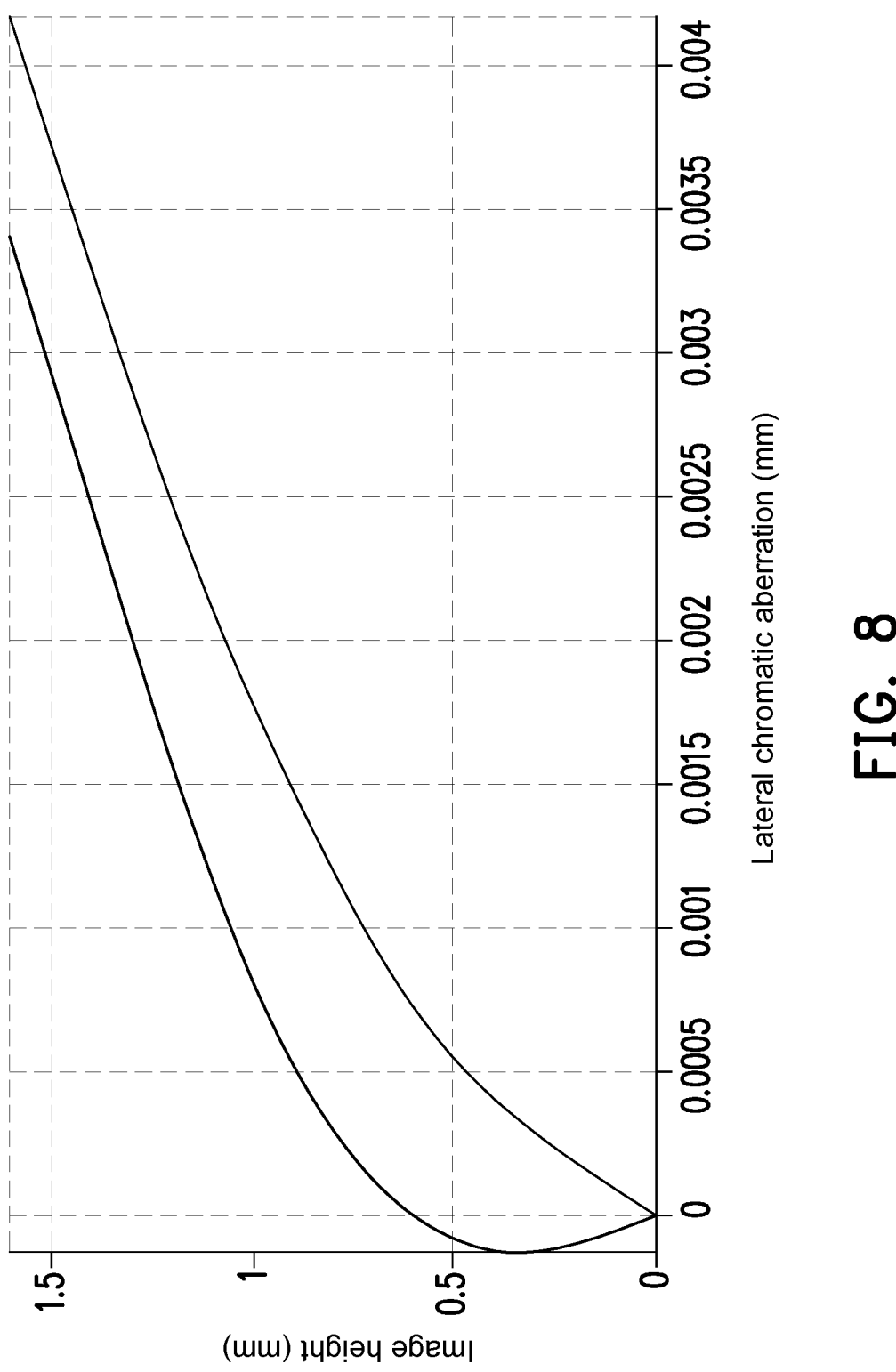
FIG. 8 is a schematic diagram illustrating lateral chromatic aberration of the optical lens depicted in FIG. 7.
Figure 9:
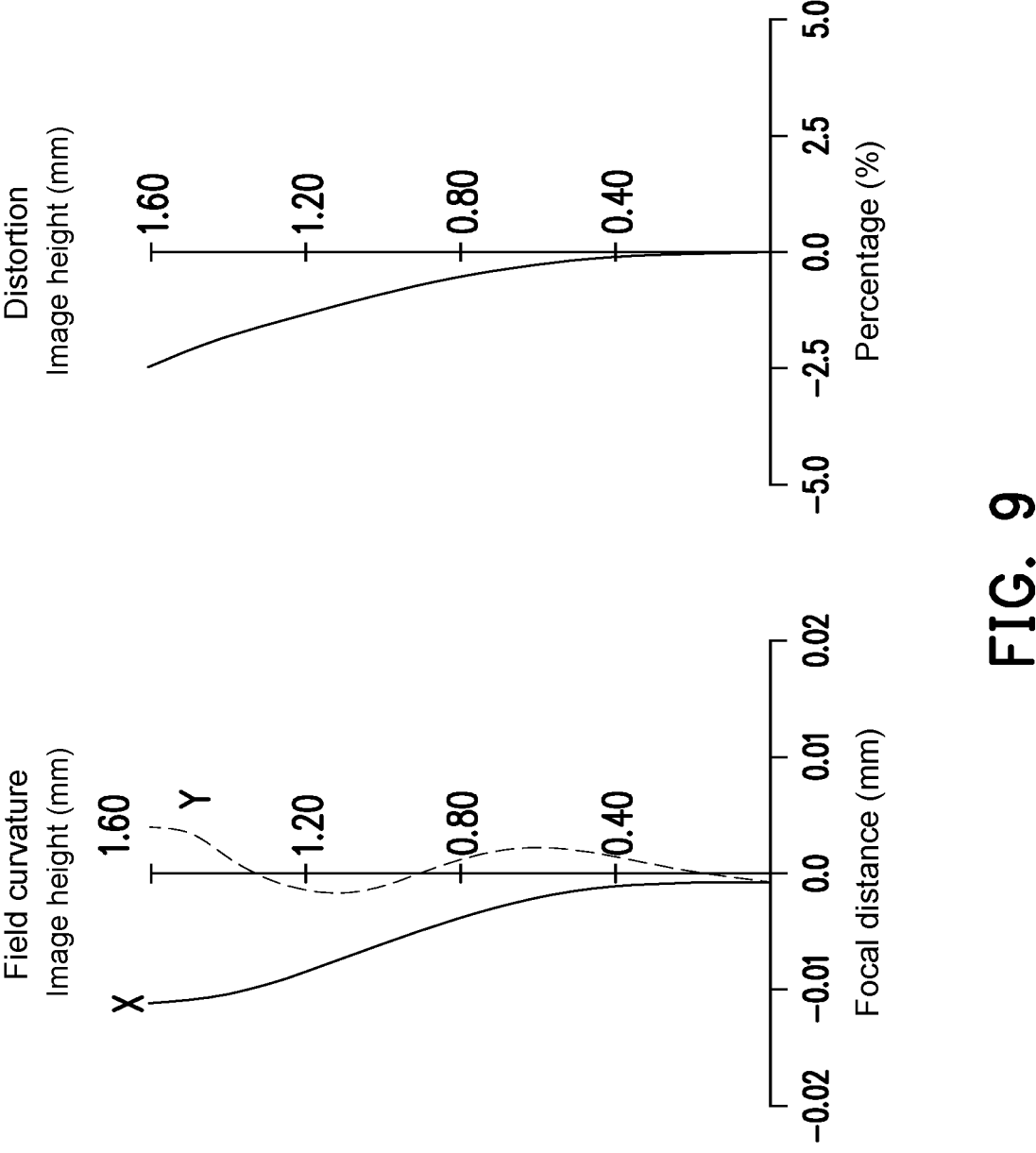
FIG. 9 is a schematic diagram illustrating astigmatic field curvature and distortion of the optical lens depicted in FIG. 7.
Figure 10:
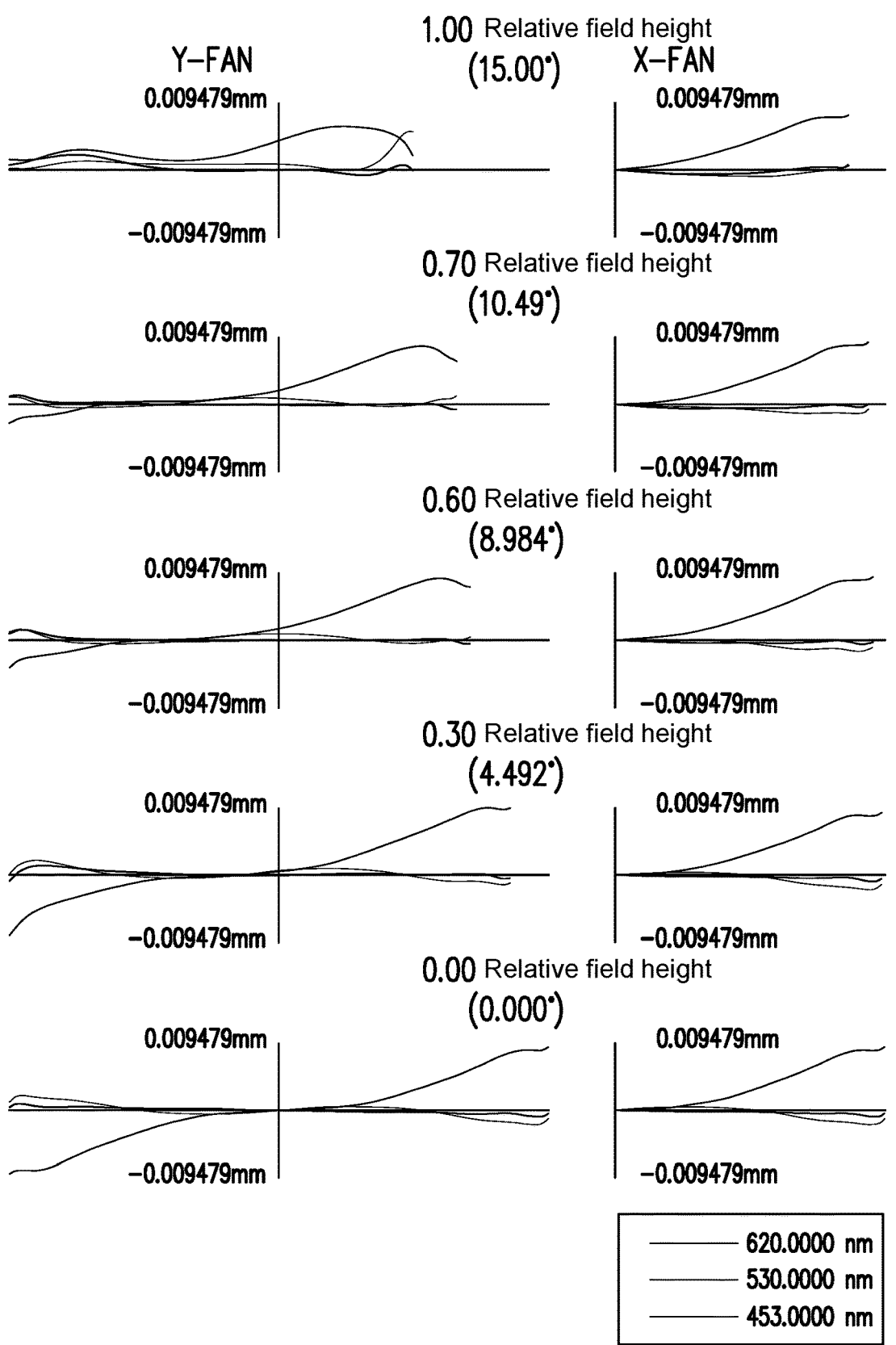
FIG. 10 is a schematic diagram illustrating transverse ray fan plots of the optical lens depicted in FIG. 7.
Figure 11A:
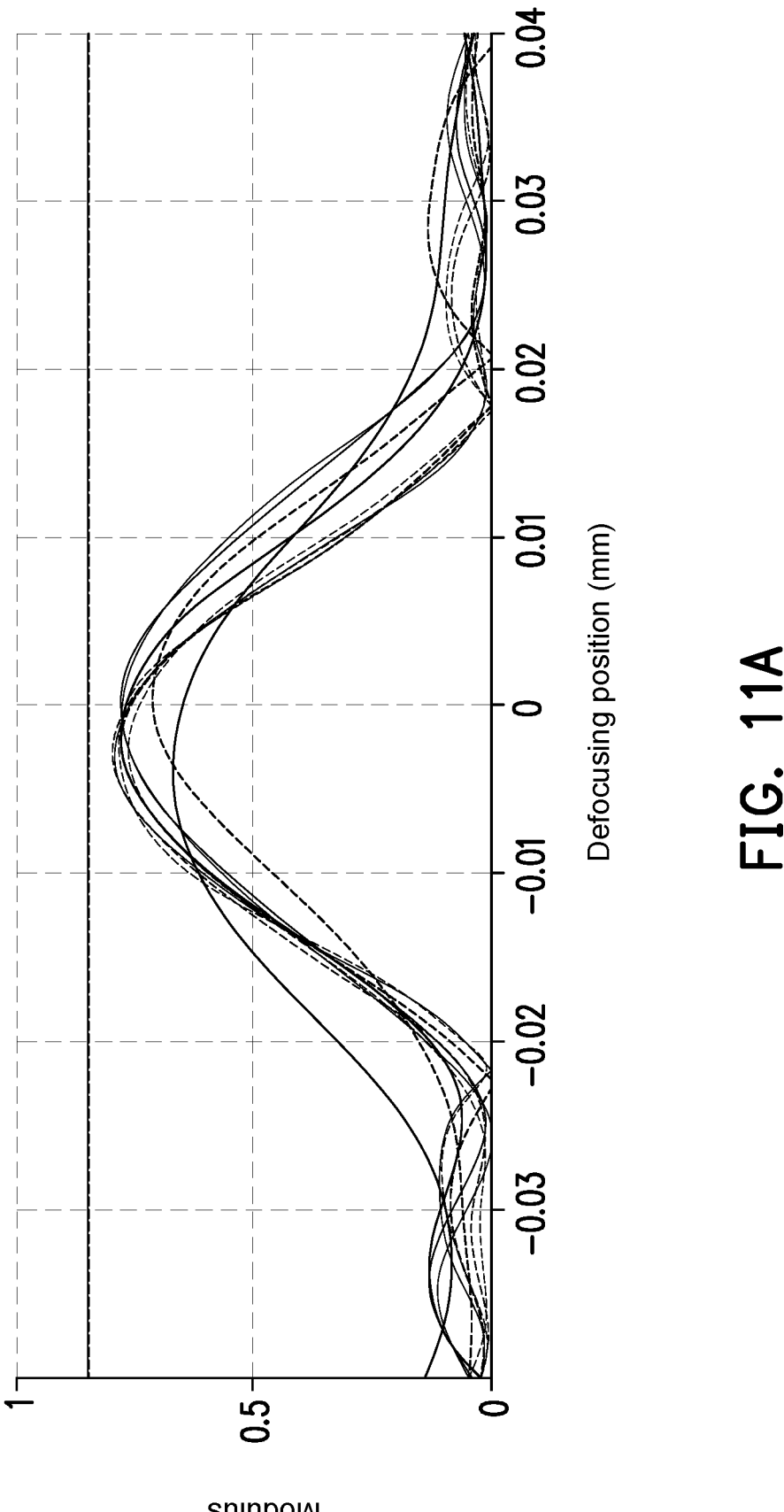
FIG. 11A to FIG. 11F are MTF curves of the optical lens depicted in FIG. 7 at different temperatures.
Figure 11B:
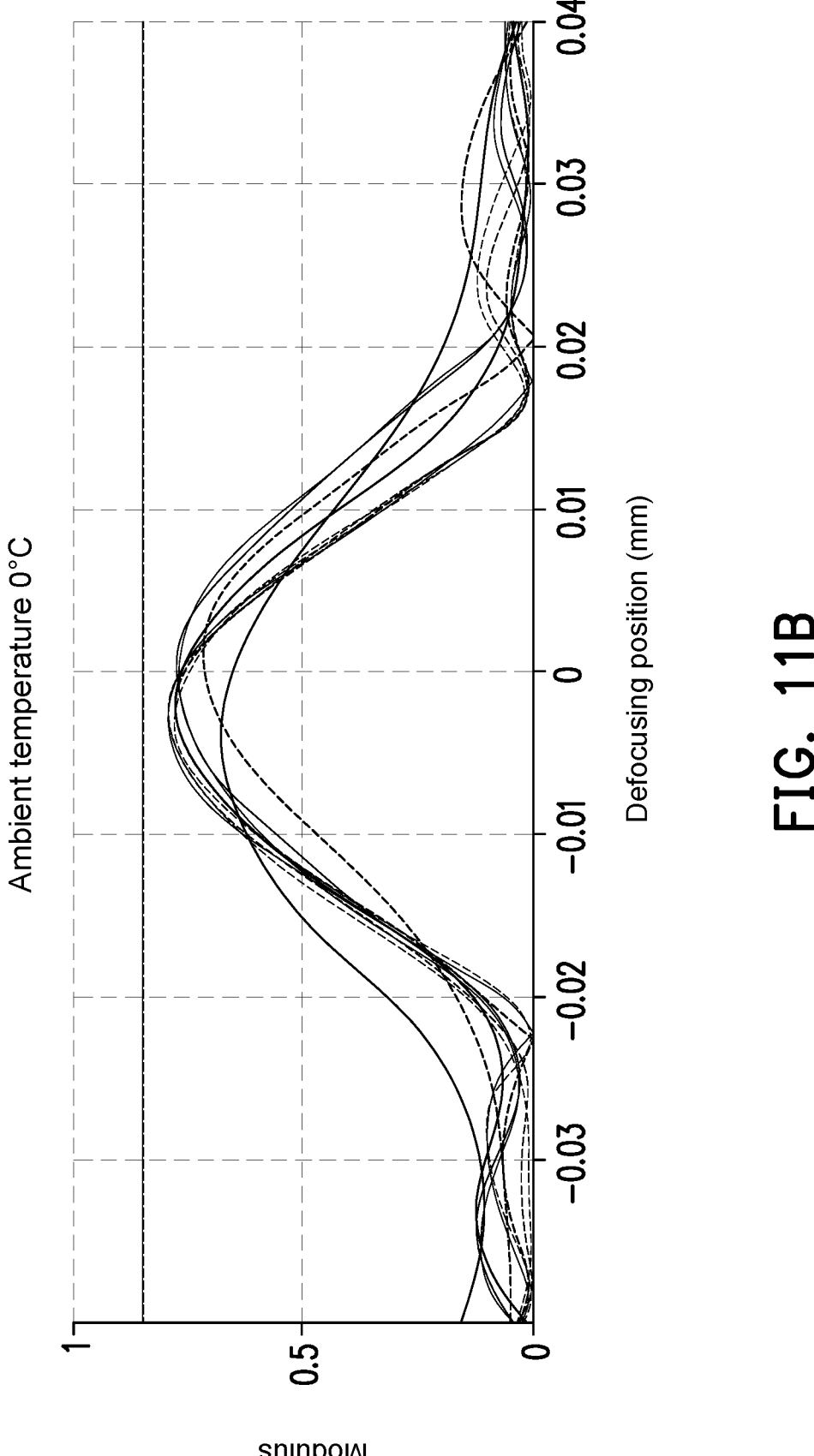
Figure 11C:
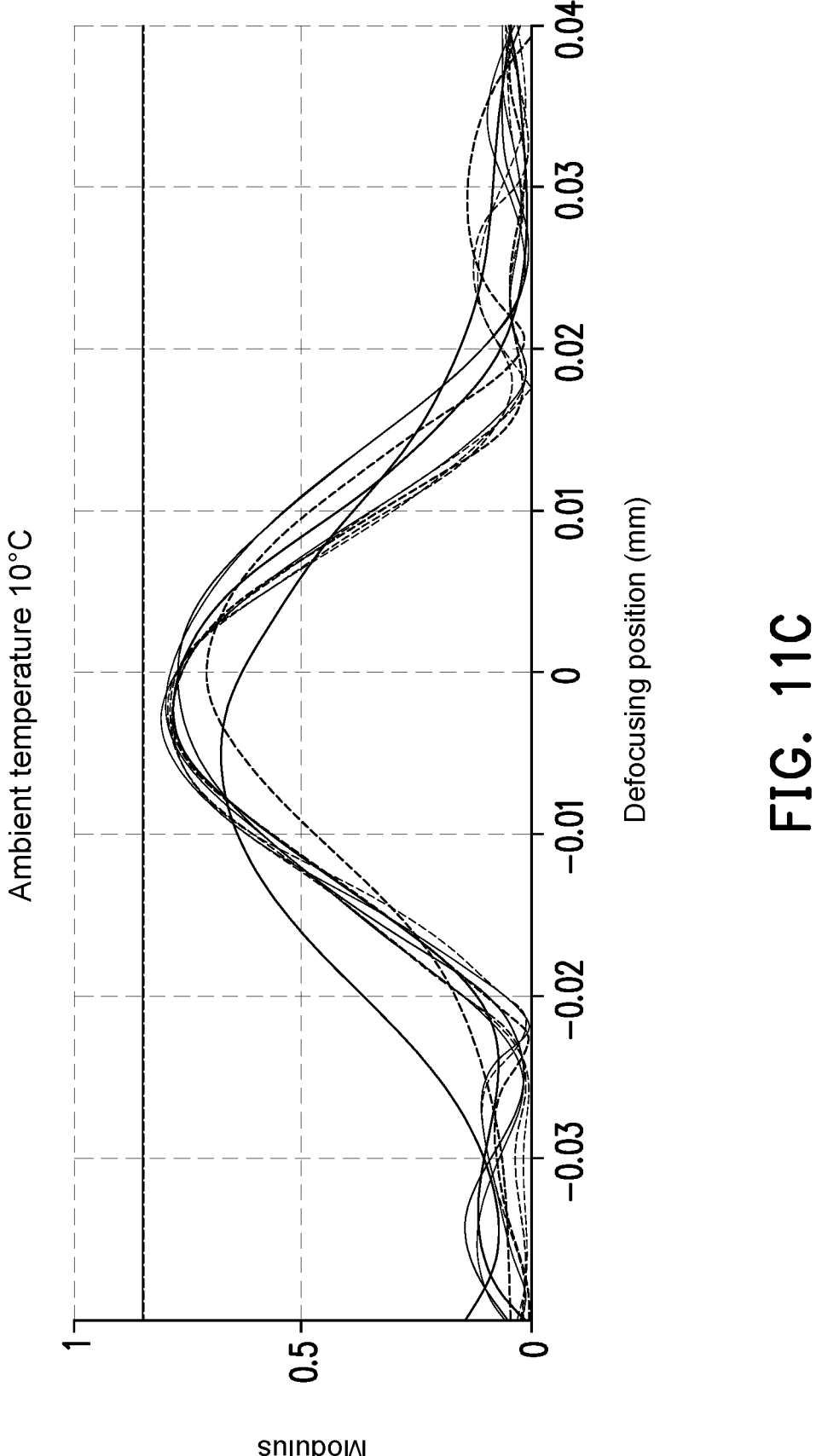
Figure 11D:
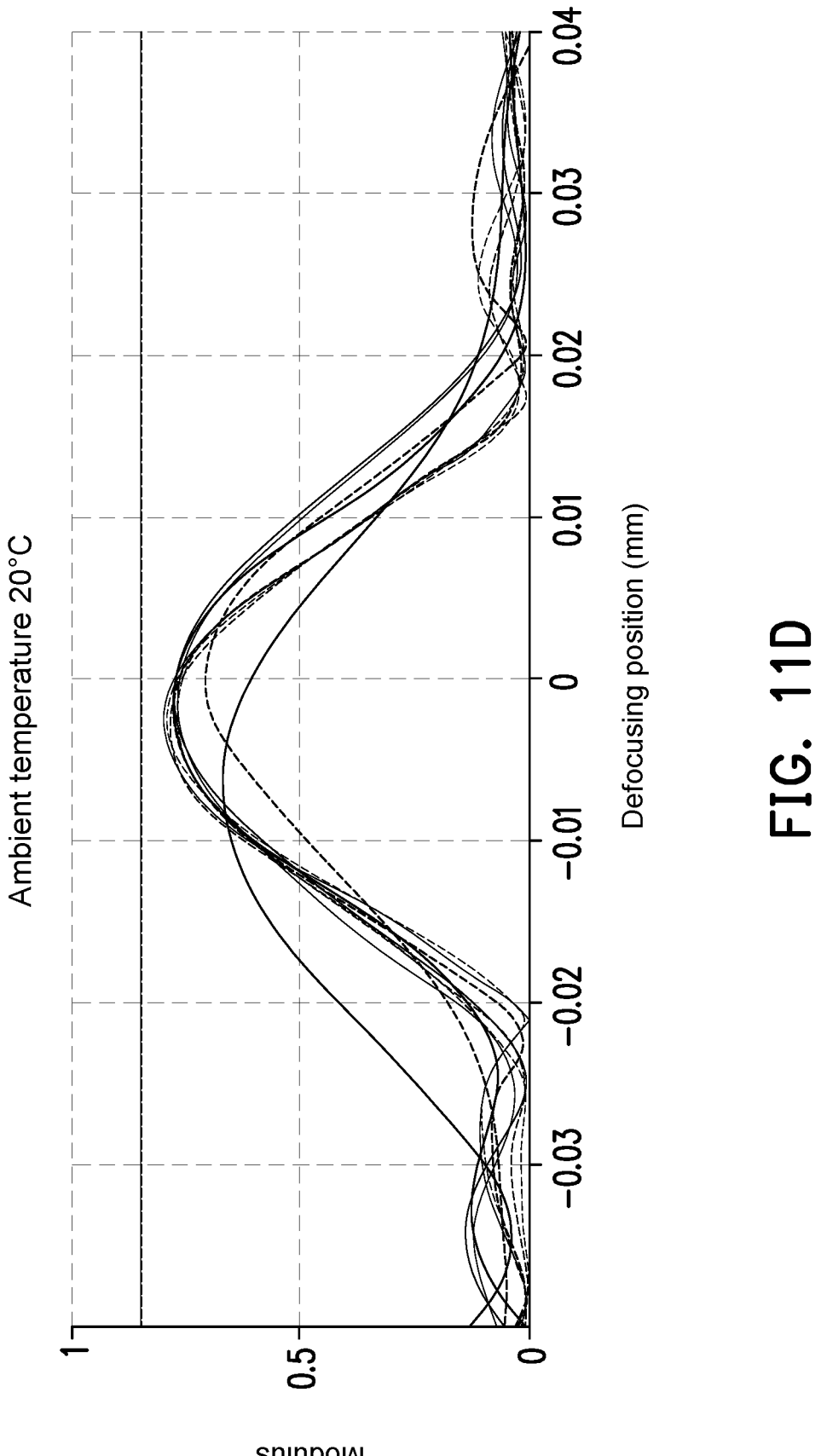
Figure 11E:
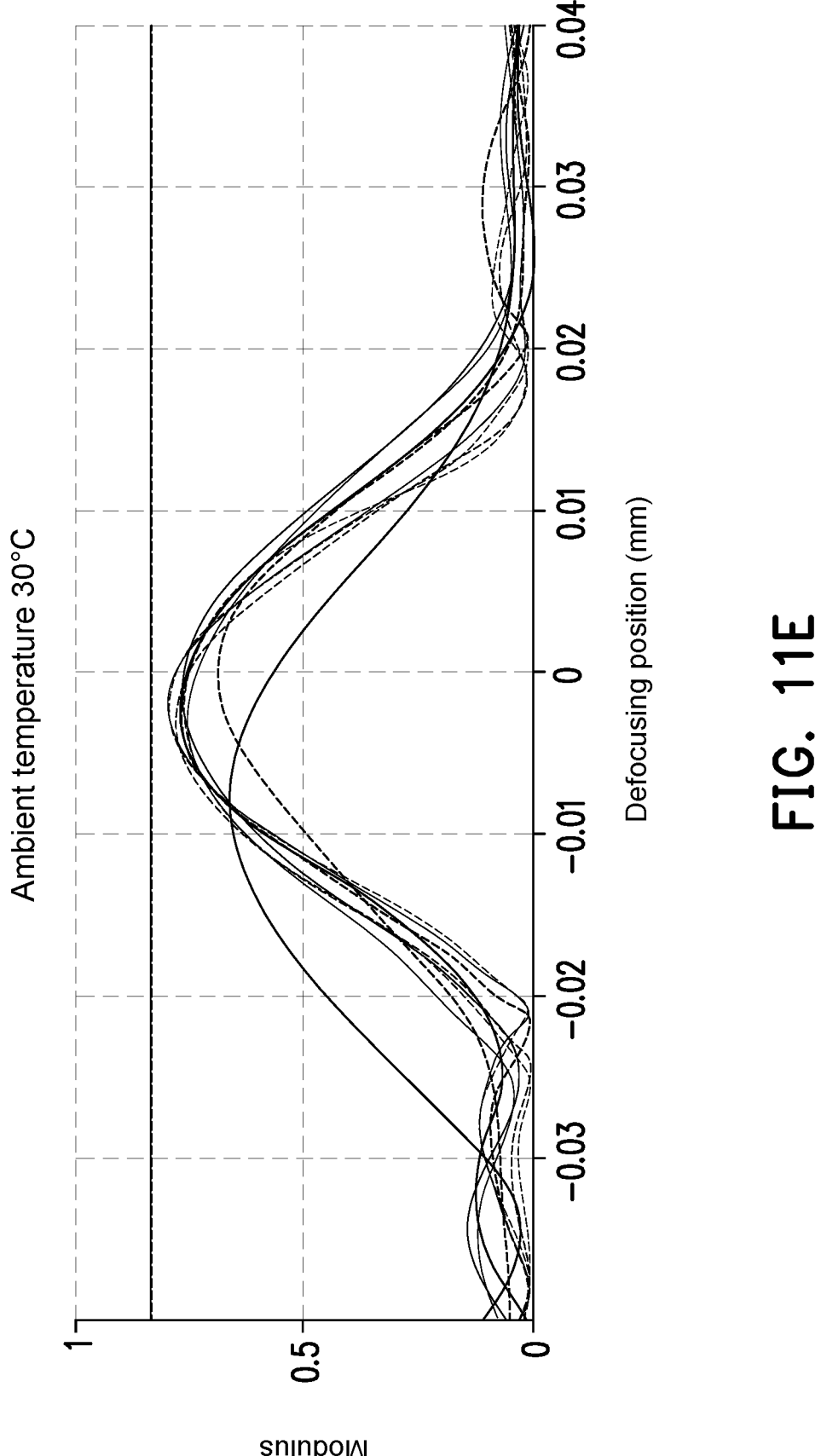
Figure 11F:
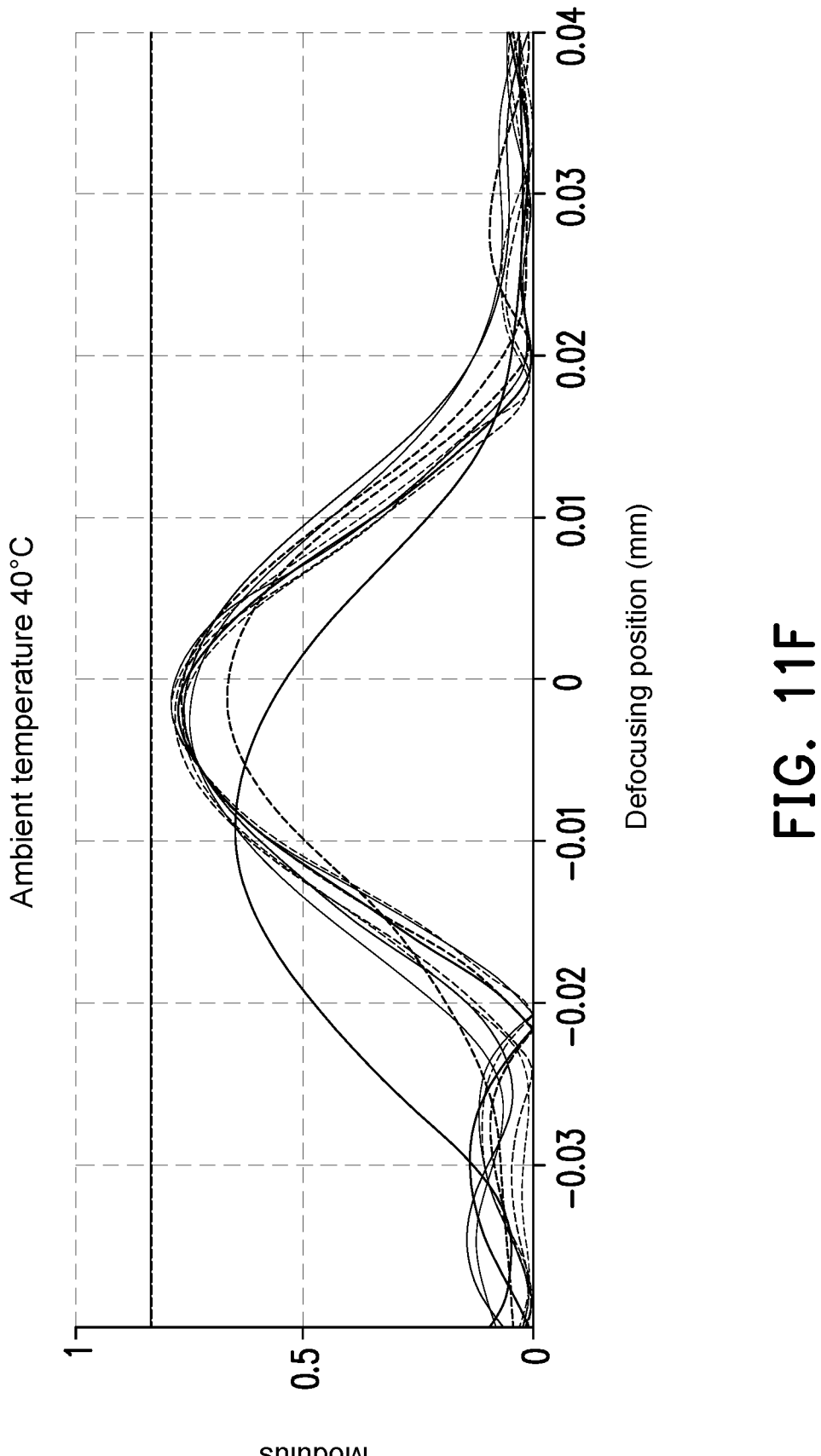

FIG. 8 illustrates lateral chromatic aberration of the optical lens 110 according to the second embodiment. FIG. 9 illustrates the field curvature aberration in a sagittal direction (marked as X), the field curvature aberration in a tangential direction (marked as Y), and distortion aberration of the optical lens 110 according to the second embodiment when a reference wavelength is 530 nm. FIG. 10 illustrates the transverse ray fan plots of the optical lens 110 according to the second embodiment and is a graph of simulated data while the wavelengths are respectively 453 nm, 530 nm, and 620 nm. FIG. 11A to FIG. 11F are MTF curves of the optical lens 110 provided in the second embodiment at different temperatures, respectively. In this embodiment, it can be seen from FIG. 8 that the chromatic aberration between the

TABLE 5

| Surface | K | $a_4$ | $a_6$ | $a_8$ | $a_{10}$ | $a_{12}$ | $a_{14}$ |
|---|---|---|---|---|---|---|---|
| 2 | −9.05E−001 | 8.50E−003 | 7.54E−004 | 3.16E−005 | −1.80E−005 | 2.11E−005 | −4.35E−006 |
| 3 | −1.45E−000 | −1.06E−003 | 9.98E−005 | −4.48E−005 | 7.56E−006 | 1.21E−008 | −2.80E−007 |
| 4 | 0 | −1.06E−004 | 1.59E−004 | 2.28E−005 | 2.41E−006 | 1.87E−008 | 4.68E−008 |
| 5 | 0 | 8.77E−004 | 1.98E−004 | 3.00E−005 | −2.34E−007 | 7.25E−007 | 4.16E−007 |
| 6 | −1.91E−001 | −1.69E−002 | 1.69E−003 | −4.22E−004 | 2.99E−005 | 1.49E−006 | 1.72E−007 |
| 7 | −9.90E−000 | −6.09E−003 | −1.77E−004 | −6.03E−006 | −6.77E−006 | 2.91E−007 | 2.30E−007 |
| 8 | 0 | 2.31E−003 | −2.36E−003 | 4.72E−004 | −4.67E−005 | −5.73E−007 | 2.54E−007 |
| 9 | 0 | 3.34E−003 | −6.78E−004 | 2.14E−004 | −2.61E−005 | 3.31E−006 | −2.60E−007 |

When the ambient temperature provided in the second embodiment is 0° C., 10° C., 20° C., 30° C., and 40° C., respectively, the values of the temperatures (° C.) of the first lens 111, the second lens 113, the third lens 115, and the fourth lens 117 of the optical lens 110 are shown in Table 6 below. Moreover, when the optical lens 110 provided in the second embodiment is applied in thermal equilibrium within the ambient temperature range from 0° C. to 40° C. without re-adjusting the focal length thereof, the back focus of the optical lens has a thermal drift less than 0.01 mm corresponding to the center point of the projection image.

TABLE 6

| Ambient temperature | Fourth lens 117 | Third lens 115 | Second lens 113 | First lens 111 |
|---|---|---|---|---|
| 0 | 8 | 11 | 16 | 19 |
| 10 | 18 | 21 | 26 | 29 |
| 20 | 28 | 31 | 36 | 39 |
| 30 | 38 | 41 | 46 | 49 |
| 40 | 48 | 51 | 56 | 59 |

FIG. 8 is a schematic diagram illustrating lateral chromatic aberration of the optical lens depicted in FIG. 7. FIG. 9 is a schematic diagram illustrating astigmatic field curvature and distortion of the optical lens depicted in FIG. 7. FIG. 10 is a schematic diagram illustrating transverse ray fan plots of the optical lens depicted in FIG. 7. FIG. 11A to FIG. 11F are MTF curves of the optical lens depicted in FIG. 7 at different temperatures. With reference to FIG. 8 to FIG. 11F, wavelengths is small and the performance of the optical lens 110 is favorable in terms of chromatic aberration. It can be seen from FIG. 9 that the field curvature aberration of the optical lens 110 provided in this embodiment falls within ±0.02 mm, indicating that the optical lens 110 provided in the second embodiment may effectively eliminate aberration. The distortion aberration diagram shows that the distortion aberration is maintained within a range of ±2.5%, indicating that the distortion aberration provided in the second embodiment satisfies the imaging quality requirements of the optical lens 110, and the optical lens 110 may provide good imaging quality.

Figure 12:
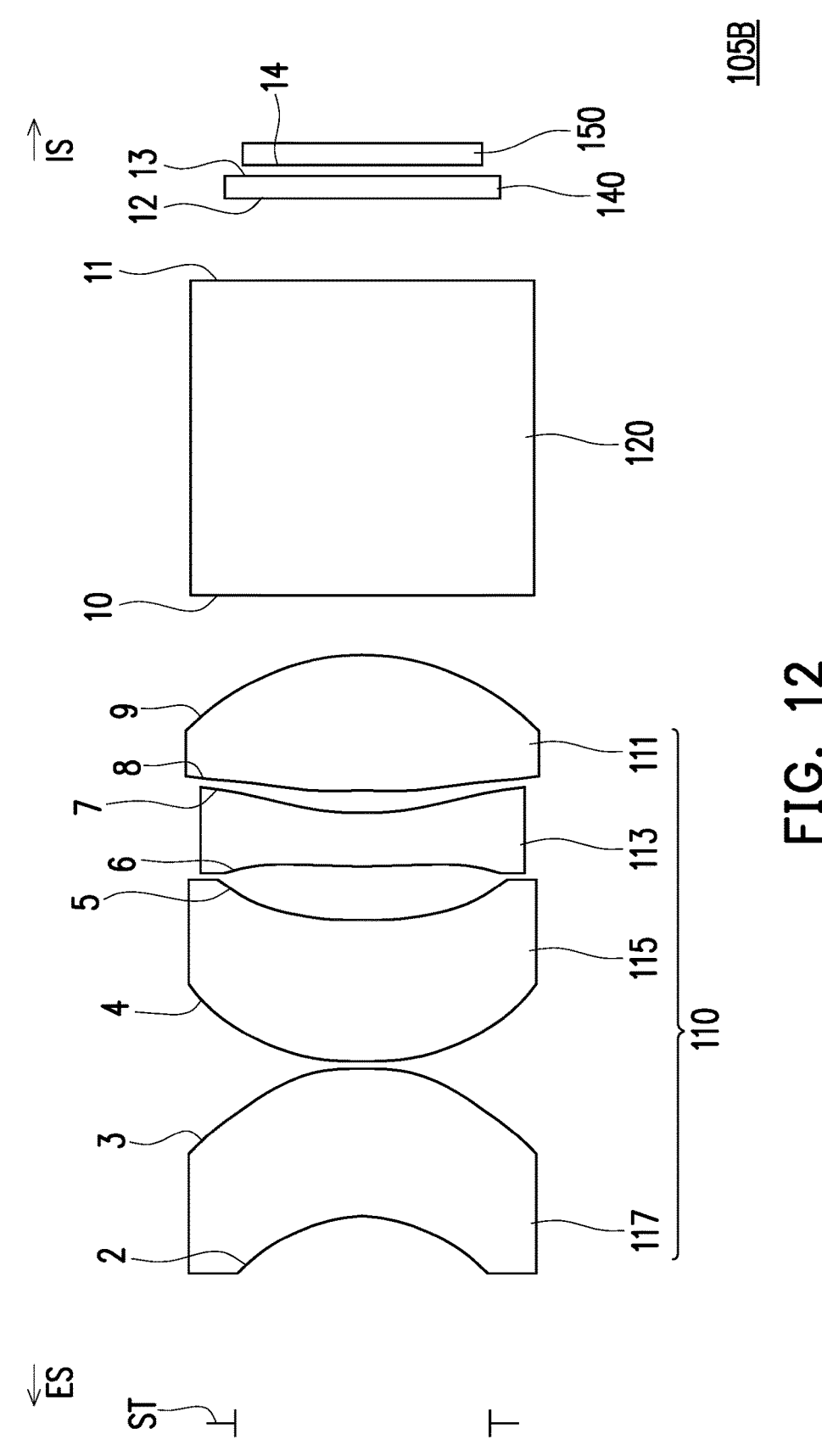
FIG. 12 is a schematic diagram of an imaging module according to a third embodiment of the invention.

FIG. 12 is a schematic diagram of an imaging module according to a third embodiment of the invention. With reference to FIG. 12, the imaging module 105B provided in the third embodiment is substantially similar to the imaging module 105 provided in the first embodiment, while the differences between the two embodiments are described as follows. Specifically, each optical data of the optical lens 110, the aspherical coefficients, and the parameters of the lenses 111, 113, 115, and 117 are more or less different. In addition, in the present embodiment, the material of the first lens 111 is glass, and the materials of the second lens 113, the third lens 115, and the fourth lens 117 are plastic. The refracting powers of the first lens 111, the second lens 113, the third lens 115, and the fourth lens 117 are positive, negative, positive, and positive, respectively. A surface of the first lens 111 may be aspherical or spherical. Other detailed optical data provided in the third embodiment are shown in Table 7 below.

TABLE 7

Third embodiment
EFL = 5.98 mm, half viewing angle = 15°, image height = 1.6 mm.

| Element | Surface | Curvature radius(mm) | Distance (mm) | Refractive index | Abbe number |
|---|---|---|---|---|---|
| Virtual image | | Infinite | Infinite | | |
| Stop ST | | Infinite | 2.92 | | |
| Fourth lens | Light exit surface 2 | −1.84 | 2.09 | 1.53 | 55.9 |
| 117 | Light incidence surface 3 | −2.43 | 0.06 | | |
| Third lens | Light exit surface 4 | 3.08 | 1.96 | 1.53 | 55.9 |
| 115 | Light incidence surface 5 | 4.46 | 0.76 | | |
| Second lens | Light exit surface 6 | 16.47 | 0.75 | 1.66 | 20.3 |
| 113 | Light incidence surface 7 | 3.21 | 0.31 | | |
| First lens | Light exit surface 8 | 9.13 | 1.89 | 1.51 | 64.1 |
| 111 | Light incidence surface 9 | −3.36 | 0.82 | | |
| Prism | Light exit surface 10 | Infinite | 4.5 | 1.51 | 64.1 |
| 120 | Light incidence surface 11 | Infinite | 1.07 | | |
| Glass cover | Light exit surface 12 | Infinite | 0.3 | 1.50 | 61.1 |
| 140 | Light incidence surface 13 | Infinite | 0.01 | | |
| Imaging element 150 | Imaging plane 14 | Infinite | | | |

It is also worth noting that in the optical lens 110 provided in the third embodiment, the focal length of the optical lens 110 is 5.98 mm, the focal length of the glass lens (i.e., the third lens 115) is 5 mm, the abbe number of the glass lens (i.e., the third lens 115) is 64.06, and the fourth lens 117 closest to the stop ST has the focal length of 61.41 mm. In other words, the optical lens 110 provided in the third embodiment also satisfies the three conditions satisfied by the optical lens 110 depicted in FIG. 1A.

In this embodiment, the aspheric coefficients of the above-aspheric surfaces in formula (1) are shown in Table 8 below. In the present embodiment, the 2i-th-order aspheric coefficient $a_2$ of each aspheric surface is zero and thus is not listed in the table.

TABLE 8

| Surface | K | $a_4$ | $a_6$ | $a_8$ | $a_{10}$ | $a_{12}$ | $a_{14}$ |
|---|---|---|---|---|---|---|---|
| 2 | −9.10E−001 | 8.90E−003 | −6.88E−004 | −5.48E−004 | 7.64E−006 | 7.43E−005 | −1.36E−005 |
| 3 | −1.27E−000 | −2.19E−003 | −5.78E−005 | −6.55E−005 | 8.14E−006 | 1.22E−006 | −2.08E−007 |
| 4 | 0 | −2.24E−003 | −1.92E−004 | 3.32E−006 | 4.87E−006 | 5.01E−007 | −8.26E−008 |
| 5 | 0 | 3.38E−003 | 6.63E−004 | 3.22E−005 | −1.11E−005 | 1.22E−006 | 1.84E−006 |
| 6 | −6.81E−001 | −1.51E−002 | 2.05E−003 | −5.17E−004 | 7.56E−006 | −2.42E−006 | 7.27E−007 |
| 7 | −6.08E−000 | −7.03E−003 | −3.16E−004 | −2.75E−006 | −5.98E−007 | 1.61E−006 | 5.97E−008 |
| 8 | 0 | −1.46E−003 | −2.36E−003 | 5.08E−004 | −3.73E−005 | 1.09E−006 | 6.19E−008 |
| 9 | 0 | 1.80E−003 | −7.69E−004 | 1.96E−004 | −3.05E−005 | 3.39E−006 | −1.70E−007 |

When the ambient temperature provided in the third embodiment is 0° C., 10° C., 20° C., 30° C., and 40° C., respectively, the values of the temperatures (° C.) of the first lens 111, the second lens 113, the third lens 115, and the fourth lens 117 of the optical lens 110 are shown in Table 9 below. Moreover, when the optical lens 110 provided in the third embodiment is applied in thermal equilibrium within the ambient temperature range from 0° C. to 40° C. without re-adjusting the focal length thereof, the back focus of the optical lens has a thermal drift less than 0.01 mm corresponding to the center point of the projection image.

TABLE 9

| Ambient temperature | Fourth lens 117 | Third lens 115 | Second lens 113 | First lens 111 |
|---|---|---|---|---|
| 0 | 8 | 11 | 16 | 19 |
| 10 | 18 | 21 | 26 | 29 |

TABLE 9-continued

| Ambient temperature | Fourth lens 117 | Third lens 115 | Second lens 113 | First lens 111 |
|---|---|---|---|---|
| 20 | 28 | 31 | 36 | 39 |
| 30 | 38 | 41 | 46 | 49 |
| 40 | 48 | 51 | 56 | 59 |

Figure 13:
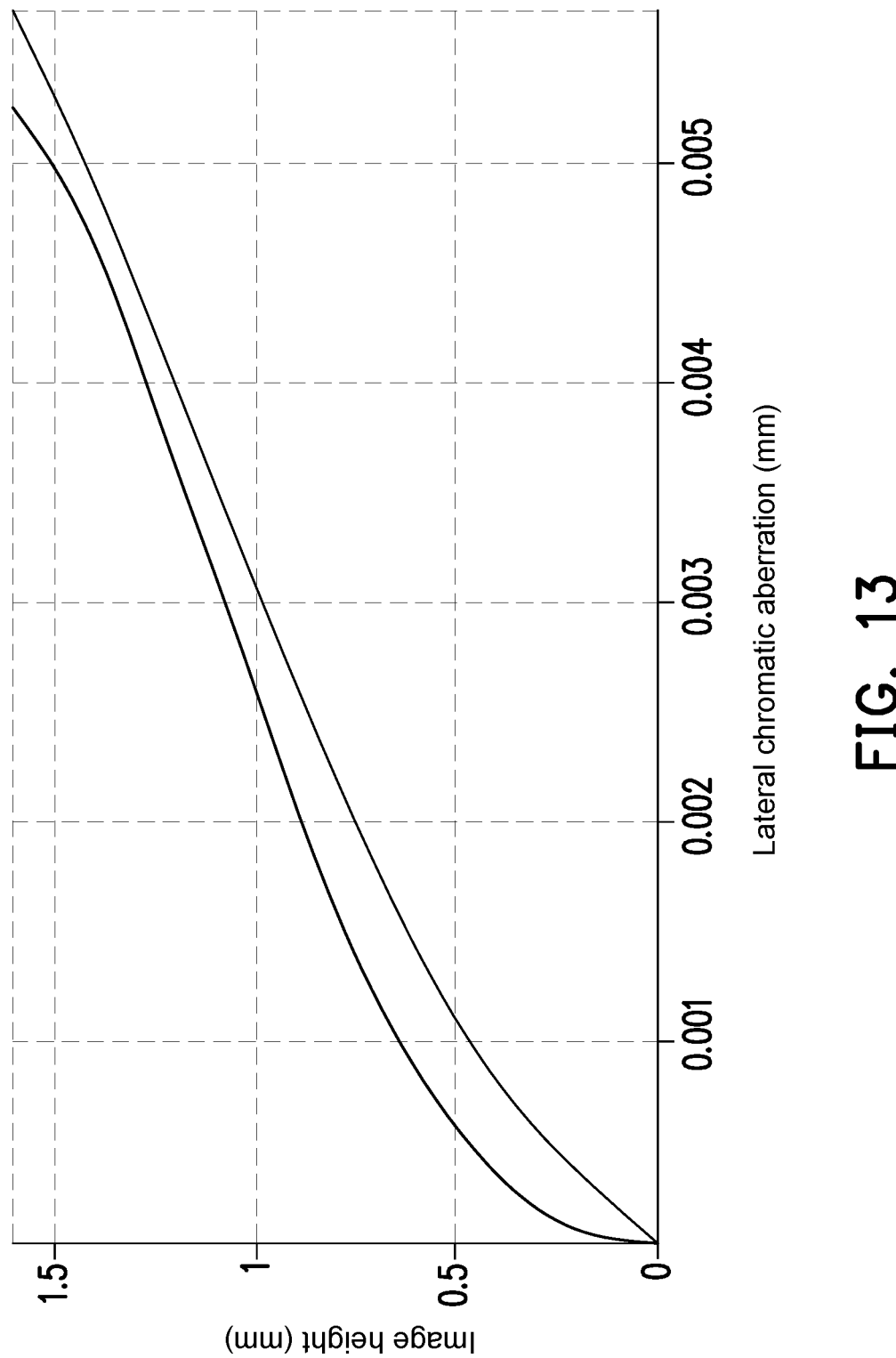
FIG. 13 is a schematic diagram illustrating lateral chromatic aberration of the optical lens depicted in FIG. 12.
Figure 14:
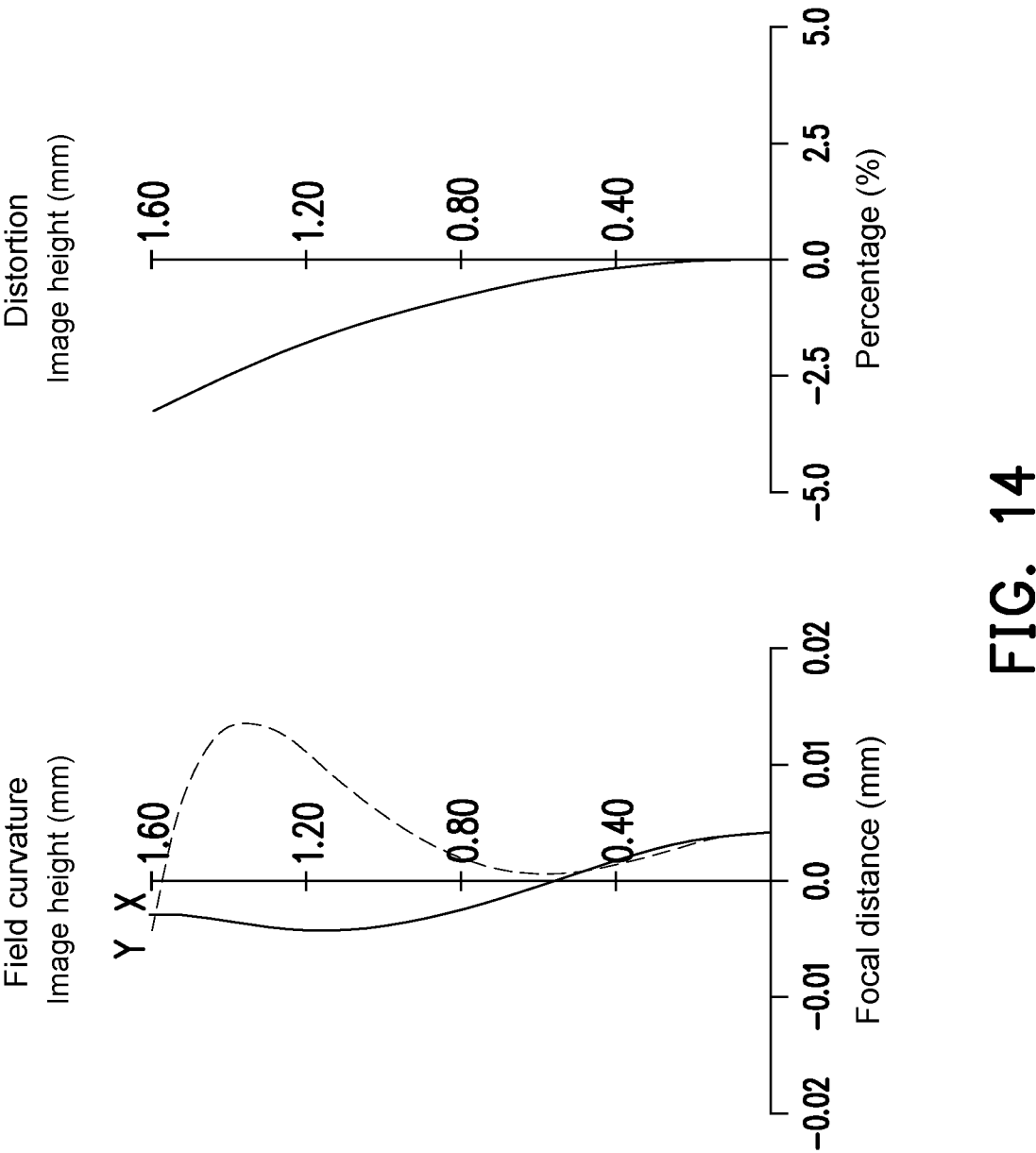
FIG. 14 is a schematic diagram illustrating astigmatic field curvature and distortion of the optical lens depicted in FIG. 12.
Figure 15:
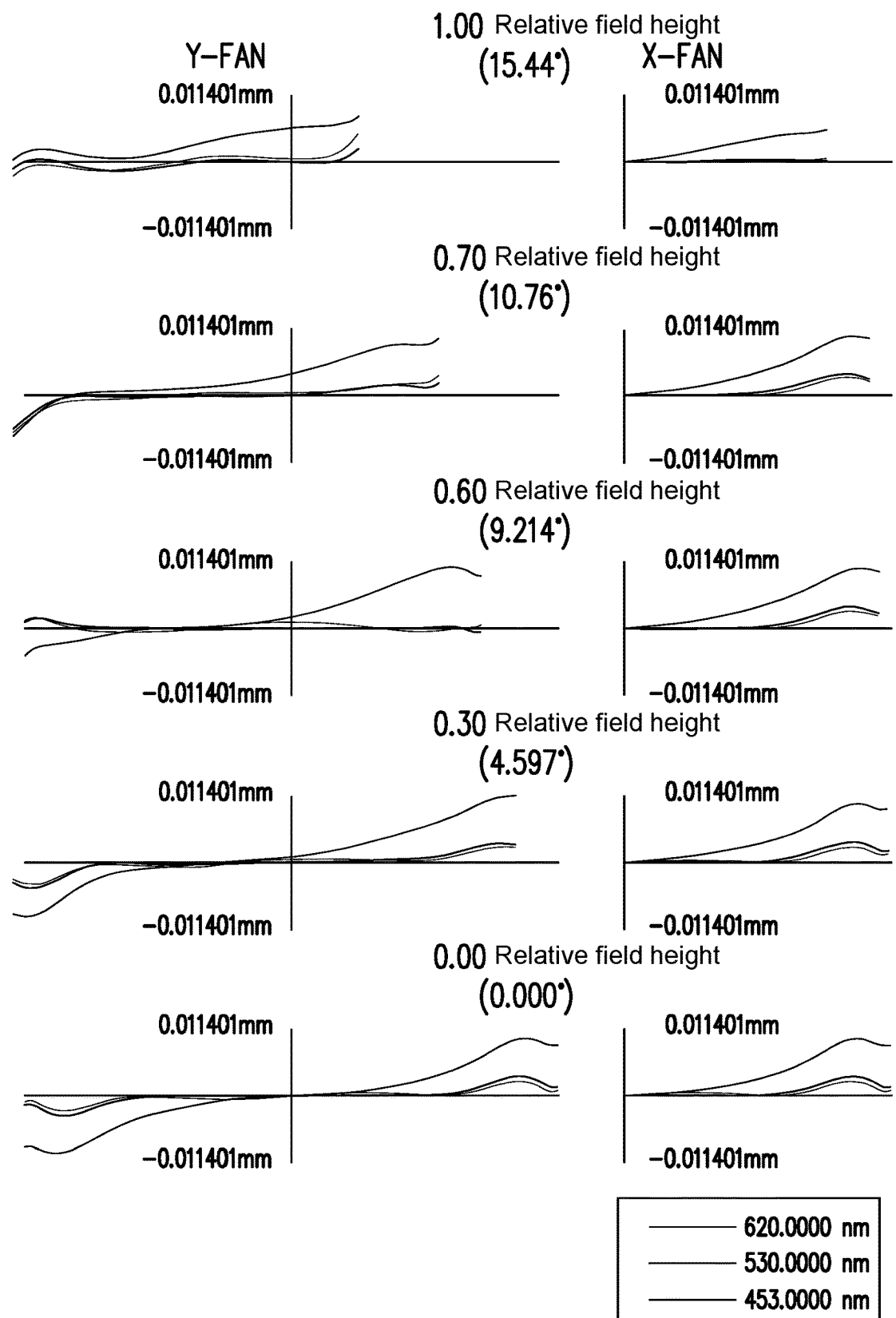
FIG. 15 is a schematic diagram illustrating transverse ray fan plots of the optical lens depicted in FIG. 12.
Figure 16A:
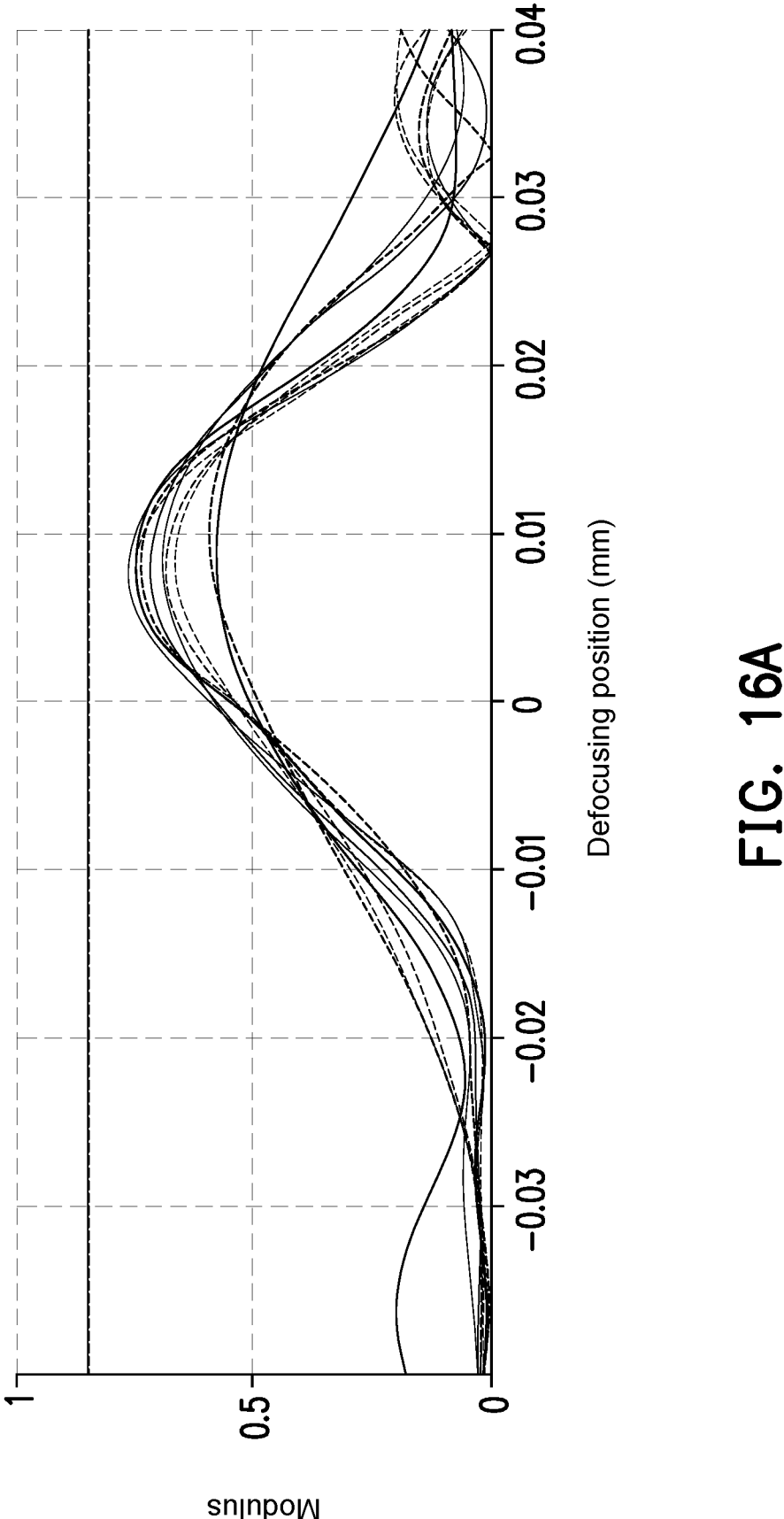
FIG. 16A to FIG. 16F are MTF curves of the optical lens depicted in FIG. 12 at different temperatures.
Figure 16B:
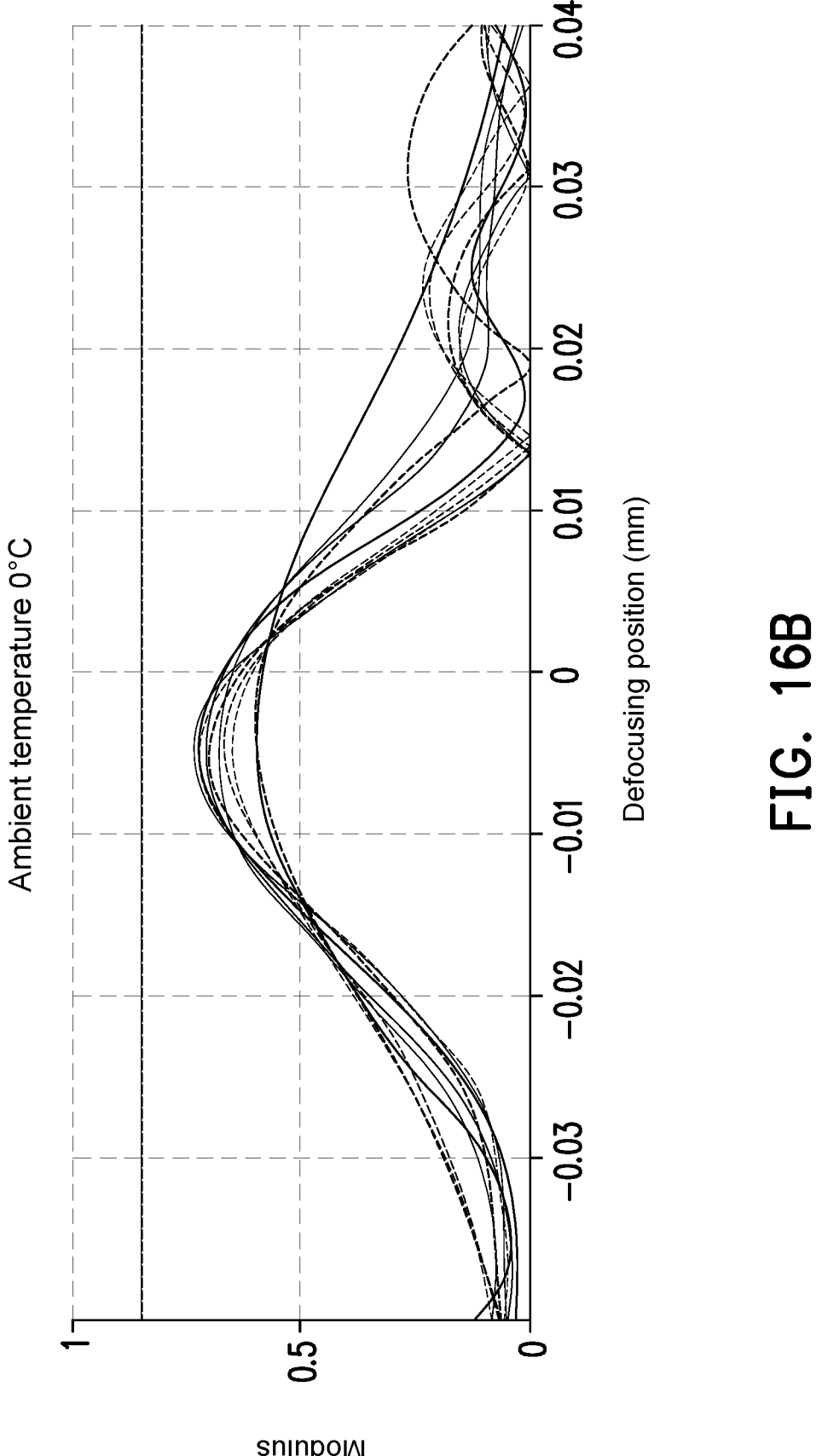
Figure 16C:
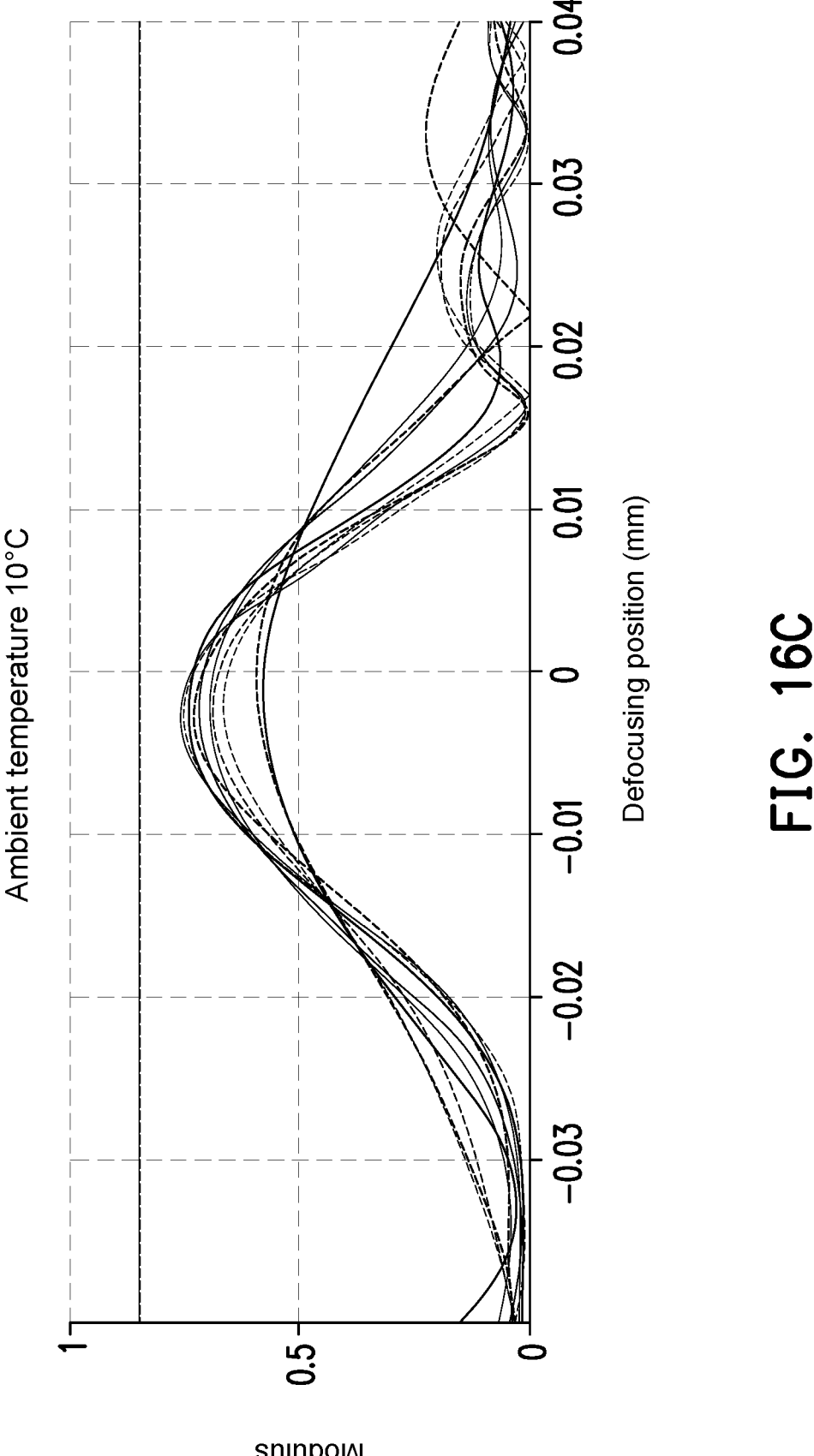
Figure 16D:
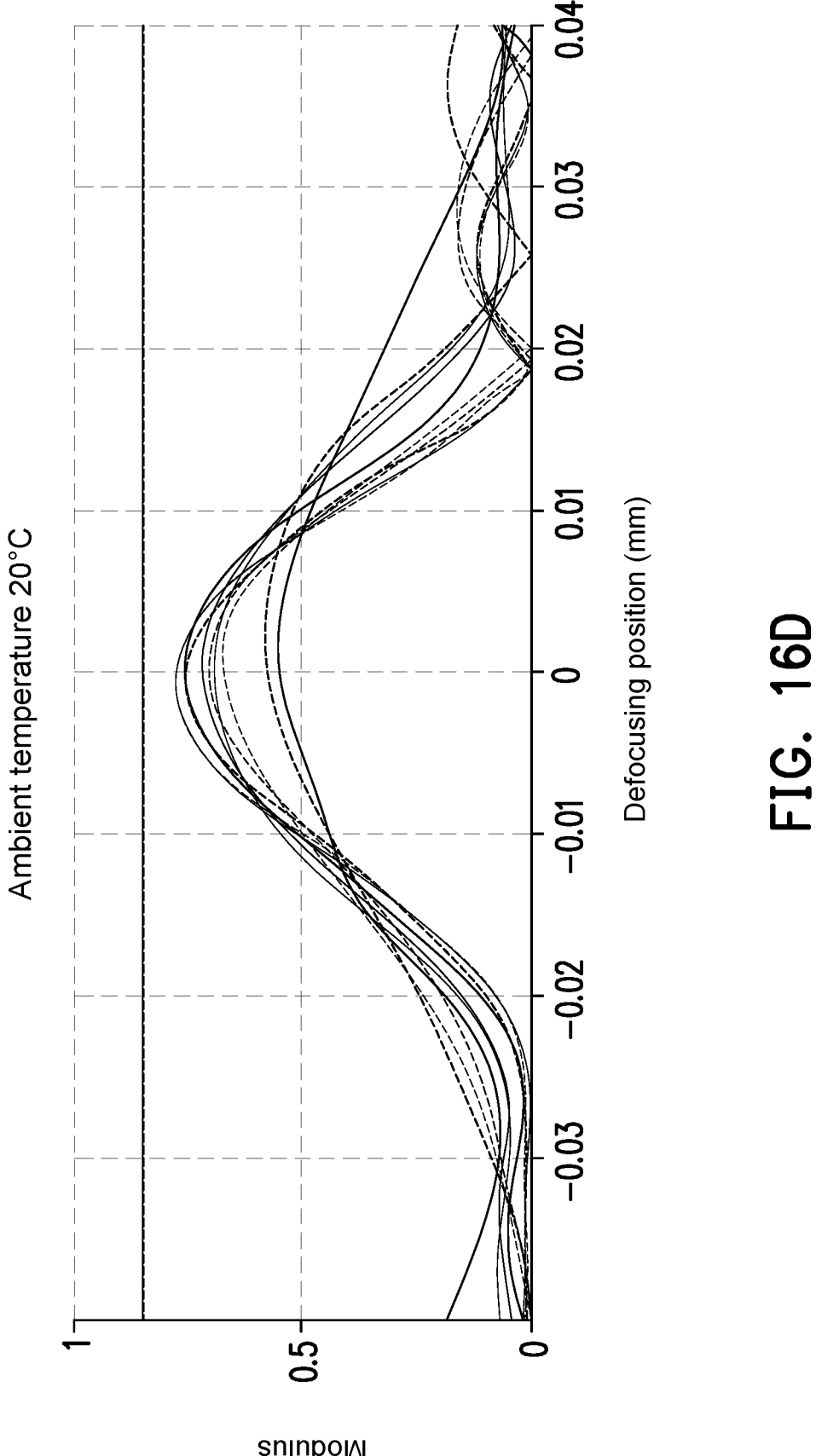
Figure 16E:
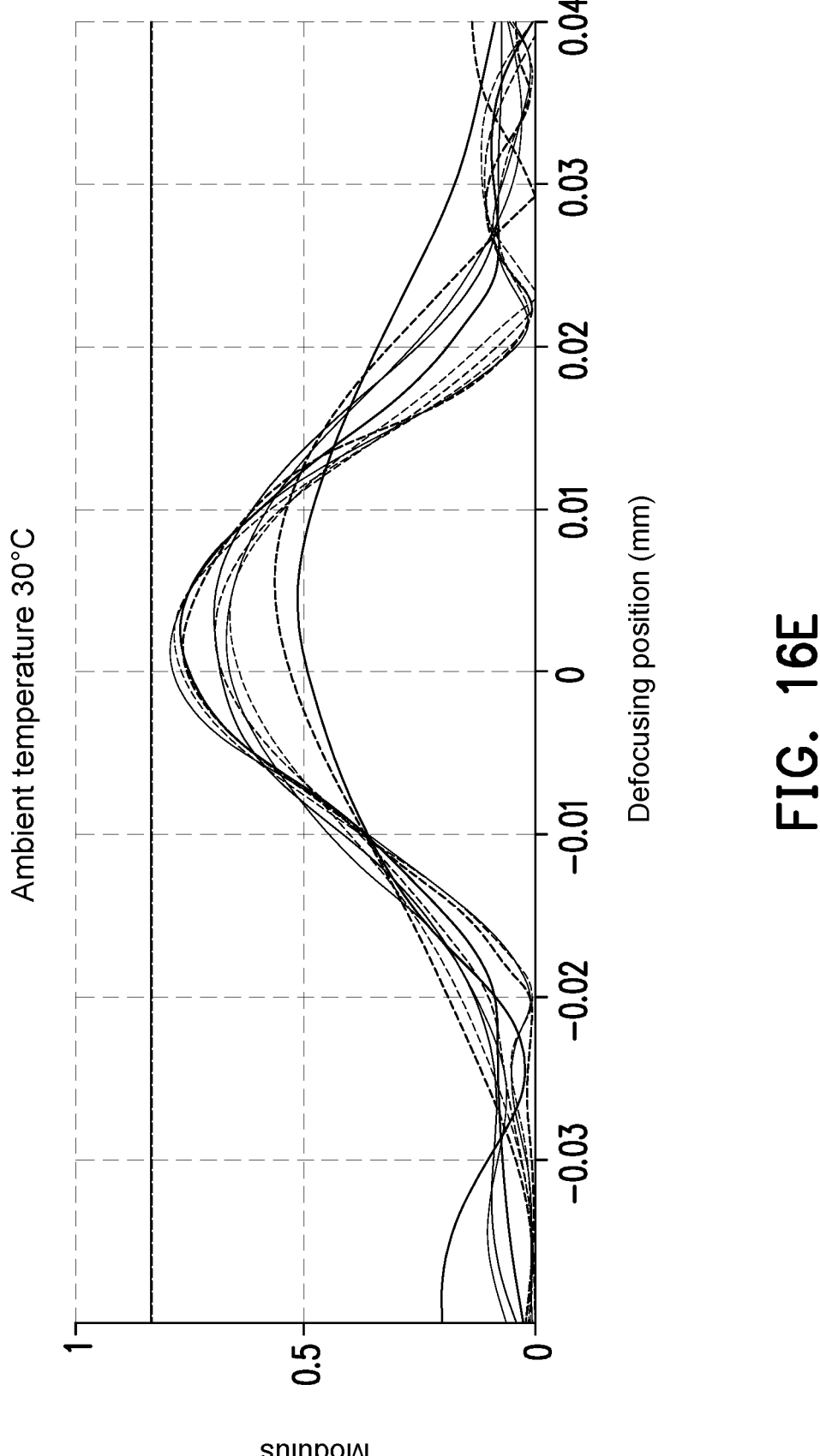
Figure 16F:
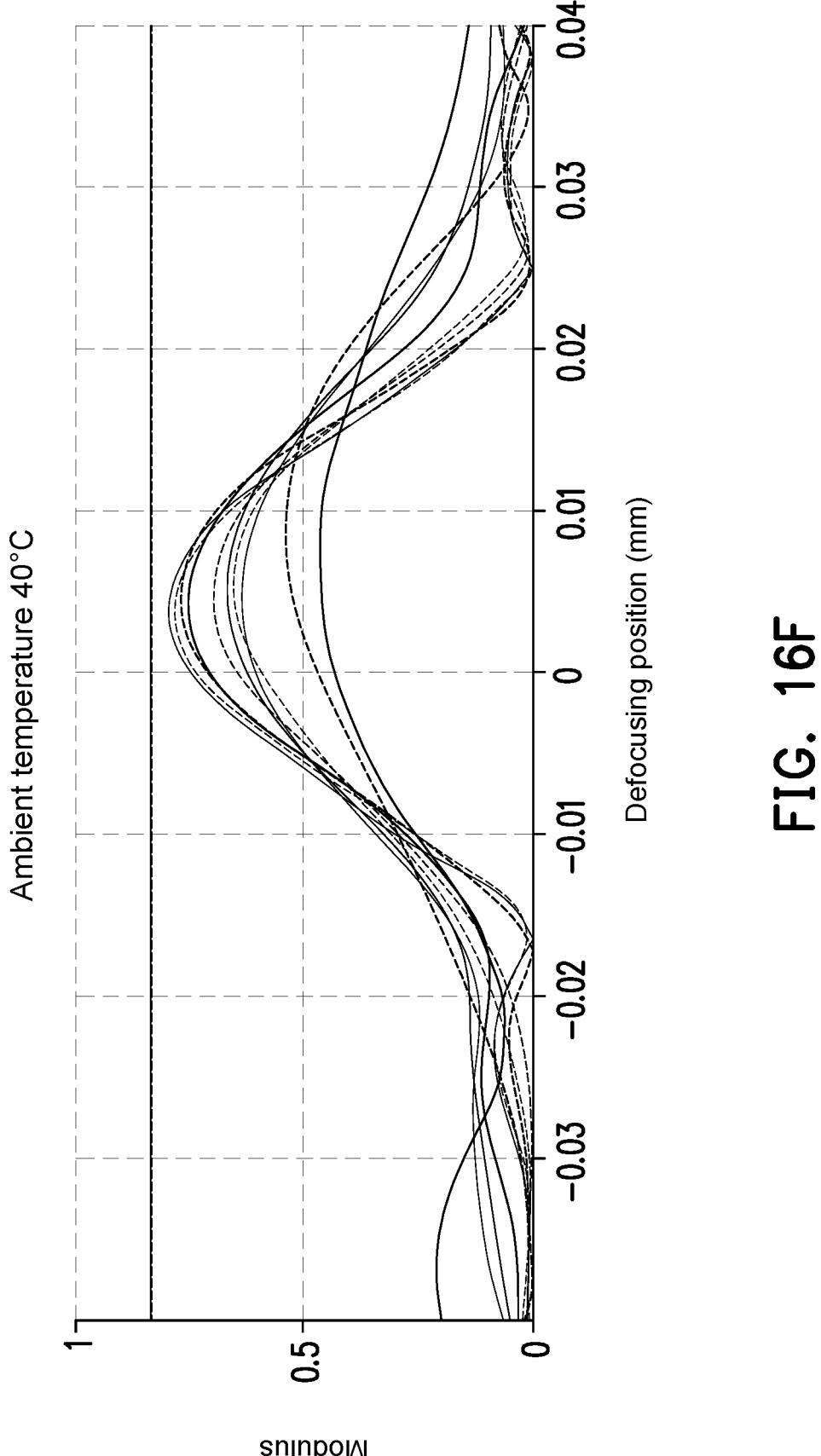

FIG. 13 is a schematic diagram illustrating lateral chromatic aberration of the optical lens depicted in FIG. 12. FIG. 14 is a schematic diagram illustrating astigmatic field curvature and distortion of the optical lens depicted in FIG. 12. FIG. 15 is a schematic diagram illustrating transverse ray fan plots of the optical lens depicted in FIG. 12. FIG. 16A to FIG. 16F are MTF curves of the optical lens depicted in FIG. 12 at different temperatures. With reference to FIG. 13 to FIG. 16F, FIG. 13 illustrates lateral chromatic aberration of the optical lens 110 according to the third embodiment. FIG. 14 illustrates the field curvature aberration in a sagittal direction (marked as X), the field curvature aberration in a tangential direction (marked as Y), and distortion aberration of the optical lens 110 according to the third embodiment when a reference wavelength is 530 nm. FIG. 15 illustrates the transverse ray fan plots of the optical lens 110 according to the third embodiment and is a graph of simulated data while the wavelengths are respectively 453 nm, 530 nm, and 620 nm. FIG. 16A to FIG. 16F are MTF curves of the optical lens 110 provided in the third embodiment at different temperatures, respectively. In this embodiment, it can be seen from FIG. 13 that the chromatic aberration between the wavelengths is small and the performance of the optical lens 110 is favorable in terms of chromatic aberration. It can be seen from FIG. 14 that the field curvature aberration of the optical lens 110 provided in this embodiment falls within ±0.02 mm, indicating that the optical lens 110 provided in the third embodiment may effectively eliminate aberration. The distortion aberration diagram shows that the distortion aberration is maintained within a range of ±5%, indicating that the distortion aberration provided in the third embodiment satisfies the imaging quality requirements of the optical lens 110, and the optical lens 110 may provide good imaging quality.

To sum up, in the optical lens and the display device provided in one or more embodiments of the invention, the optical lens includes the first lens, the second lens, the third lens, and the fourth lens, the refracting powers of the first lens, the second lens, and the third lens are positive, negative, and positive, and the first lens or the third lens is made of glass. Compared to the conventional optical lens, the optical lens provided in one or more embodiments of the invention is designed to be equipped with the relatively small 0.13-inch imaging element, so that the overall opto-mechanical volume may be reduced. The optical lens may resolve images with the spatial resolution of 125 lp/mm and has the small amount of thermal drift and thus good optical performance. Besides, the number of the lenses in the optical lens provided herein is reduced to 4 as compared to the conventional optical lens having 5 lenses, which allows the reduction of the overall volume of the imaging module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical lens, adapted to receive an image beam from an imaging element and sequentially comprising a first lens, a second lens, a third lens, and a fourth lens respectively with a refracting power along an optical axis from a light incidence side to a light exit side, wherein each of the first lens, the second lens, the third lens, and the fourth lens respectively comprises a light incidence surface and a light exit surface, the light incidence surface of each of the first lens, the second lens, the third lens, and the fourth lens faces the light incidence side and allows the image beam to pass therethrough, and the light exit surface of each of the first lens, the second lens, the third lens, and the fourth lens faces the light exit side and allows the image beam to pass therethrough, wherein the refracting power of the first lens is positive,
the refracting power of the second lens is negative,
the refracting power of the third lens is positive,
the first lens or the third lens is made of glass,
the optical lens receives the image beam from the light incidence side, the image beam forms a stop on the light exit side, and the image beam forms a minimum beam cross-section at a location of the stop,
wherein three of the first lens, the second lens, the third lens, and the fourth lens are plastic aspheric lens, and the other is a glass aspheric lens.

2. An optical lens, adapted to receive an image beam from an imaging element and sequentially comprising a first lens, a second lens, a third lens, and a fourth lens respectively with a refracting power along an optical axis from a light incidence side to a light exit side, wherein each of the first lens, the second lens, the third lens, and the fourth lens respectively comprises a light incidence surface and a light exit surface, the light incidence surface of each of the first lens, the second lens, the third lens, and the fourth lens faces the light incidence side and allows the image beam to pass therethrough, and the light exit surface of each of the first lens, the second lens, the third lens, and the fourth lens faces the light exit side and allows the image beam to pass therethrough, wherein the refracting power of the first lens is positive,
the refracting power of the second lens is negative,
the refracting power of the third lens is positive,
the first lens or the third lens is made of glass,
the optical lens receives the image beam from the light incidence side, the image beam forms a stop on the light exit side, and the image beam forms a minimum beam cross-section at a location of the stop,
wherein materials of the first lens, the second lens, the third lens, and the fourth lens are sequentially plastic, plastic, glass, and plastic.

3. The optical lens according to claim 1, wherein materials of the first lens, the second lens, the third lens, and the fourth lens are sequentially glass, plastic, plastic, and plastic.

4. The optical lens according to claim 1, wherein the refracting power of the fourth lens is positive.

5. The optical lens according to claim 2, wherein the refracting power of the fourth lens is negative.

6. The optical lens according to claim 1, wherein a full field of view angle of the optical lens ranges from 25 degrees to 35 degrees.

7. The optical lens according to claim 1, wherein the light incidence surface of the first lens is a convex surface facing the imaging element.

8. The optical lens according to claim 1, wherein the light exit surface of the third lens is a convex surface facing the stop.

9. The optical lens according to claim 1, wherein the light incidence surface of the fourth lens is a convex surface protruding toward the imaging element, and the light exit surface of the fourth lens is a concave surface facing the stop.

10. The optical lens according to claim 1, wherein the light incidence surface of the first lens, the light incidence surface of the second lens, the light exit surface of the second lens, the light incidence surface of the fourth lens, and the light exit surface of the fourth lens are aspherical surfaces.

11. The optical lens according to claim 1, wherein the optical lens satisfies a condition 0.5<fg/f<3, fg is an effective focal length of a glass lens of the optical lens, and f is an effective focal length of the optical lens.

12. The optical lens according to claim 1, wherein the optical lens satisfies a condition Vg>30, and Vg is an abbe number of a glass lens of the optical lens.

13. The optical lens according to claim 1, wherein the optical lens satisfies a condition |fs/f|>1, fs is an effective focal length of the fourth lens, and f is an effective focal length of the optical lens.

14. The optical lens according to claim 1, wherein an effective focal length of the optical lens ranges from 5.5 millimeters to 6.5 millimeters.

15. A display device, comprising:

the optical lens according to claim 1;

the imaging element, disposed on the light incidence side of the optical lens to provide the image beam; and a waveguide element, disposed on the light exit side of the optical lens and having a light coupling inlet and a light coupling outlet, wherein the image beam emitted from the imaging element passes through the optical lens and enters the waveguide element via the light coupling inlet, and the waveguide element guides the image beam, so that the image beam leaves the waveguide element via the light coupling outlet.

16. The display device according to claim 15, wherein the stop is located at or near the light coupling inlet of the waveguide element.

17. The display device according to claim 15, further comprising a prism disposed on a transmission path of the image beam and located between the imaging element and the optical lens.

18. The display device according to claim 17, further comprising an illumination light source, wherein the imaging element is a reflective image source, the illumination light source generates an illumination beam, and after the illumination beam is guided to the imaging element by the prism, the illumination beam is reflected by the imaging element to form the image beam.

19. The display device according to claim 17, wherein the imaging element is a liquid crystal on silicon panel, a digital micromirror device, an organic light emitting diode panel, or a micro light emitting diode panel.

* * * * *